(12) United States Patent
Wang et al.

(10) Patent No.: US 12,314,317 B2
(45) Date of Patent: May 27, 2025

(54) VIDEO GENERATION

(71) Applicant: BEIJING BAIDU NETCOM SCIENCE TECHNOLOGY CO., LTD., Beijing (CN)

(72) Inventors: Haifeng Wang, Beijing (CN); Hao Tian, Beijing (CN); Xinyan Xiao, Beijing (CN); Xing Li, Beijing (CN); Tian Wu, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 120 days.

(21) Appl. No.: 18/174,481

(22) Filed: Feb. 24, 2023

(65) Prior Publication Data

US 2023/0214423 A1 Jul. 6, 2023

(30) Foreign Application Priority Data

Feb. 25, 2022 (CN) .......................... 202210174087.9

(51) Int. Cl.
*G06F 16/783* (2019.01)
*G06F 16/73* (2019.01)
(Continued)

(52) U.S. Cl.
CPC .......... *G06F 16/7844* (2019.01); *G06F 16/73* (2019.01); *G06F 40/295* (2020.01);
(Continued)

(58) Field of Classification Search
CPC .................................................. G06F 16/7844
See application file for complete search history.

(56) References Cited

U.S. PATENT DOCUMENTS 5,369,577 A * 11/1994 Kadashevich ........ G06F 40/253
715/236
2007/0273696 A1 11/2007 Cheng et al.
(Continued)

FOREIGN PATENT DOCUMENTS

CN 1624686 A 6/2005
CN 101377769 A 3/2009
(Continued)

OTHER PUBLICATIONS

First Office Action of the counterpart JP App. No. 2023-026371, dated Mar. 21, 2024, 4 pages.
(Continued)

*Primary Examiner* — Van H Oberly
(74) *Attorney, Agent, or Firm* — FisherBroyles, LLP

(57) ABSTRACT

A video generation method is provided. The video generation method includes: obtaining global semantic information and local semantic information of a text, where the local semantic information corresponds to a text fragment in the text; searching, based on the global semantic information, a database to obtain at least one first data corresponding to the global semantic information; searching, based on the local semantic information, the database to obtain at least one second data corresponding to the local semantic information; obtaining, based on the at least one first data and the at least one second data, a candidate data set; matching, based on a relevancy between each of at least one text fragment and corresponding candidate data in the candidate data set, target data for the at least one text fragment; and generating, based on the target data matched with each of the at least one text fragment, a video.

19 Claims, 14 Drawing Sheets

(51) Int. Cl.
*G06F 40/295* (2020.01)
*G06F 40/30* (2020.01)
*G06F 40/40* (2020.01)
*G06N 3/0895* (2023.01)
*G10L 15/16* (2006.01)
*G10L 15/18* (2013.01)
*G10L 15/22* (2006.01)
*G10L 25/57* (2013.01)

(52) U.S. Cl.
CPC .............. *G06F 40/30* (2020.01); *G06F 40/40* (2020.01); *G06N 3/0895* (2023.01); *G10L 15/16* (2013.01); *G10L 15/1815* (2013.01); *G10L 15/22* (2013.01); *G10L 25/57* (2013.01)

(56) References Cited

U.S. PATENT DOCUMENTS

| | | | | |
|---|---|---|---|---|
| 2016/0014482 | A1* | 1/2016 | Chen | H04N 21/8456 386/241 |
| 2020/0342909 | A1* | 10/2020 | Gandhi | G06F 40/30 |
| 2020/0356589 | A1 | 11/2020 | Rekik et al. | |
| 2022/0122268 | A1* | 4/2022 | Tsun | G06V 10/82 |

FOREIGN PATENT DOCUMENTS

| | | |
|---|---|---|
| CN | 101702944 A | 5/2010 |
| CN | 106959946 A | 7/2017 |
| CN | 110110140 A | 8/2019 |
| CN | 110197521 A | 9/2019 |
| CN | 110390397 A | 10/2019 |
| CN | 111340920 A | 6/2020 |
| CN | 112966127 A | 6/2021 |
| CN | 113269093 A | 8/2021 |
| CN | 113704383 A | 11/2021 |
| CN | 113761280 A | 12/2021 |
| CN | 113784199 A | 12/2021 |
| JP | 2010503112 A | 1/2010 |
| JP | 2020173776 A | 10/2020 |
| JP | 2021099774 A | 7/2021 |
| JP | 2021114287 A | 8/2021 |

OTHER PUBLICATIONS

Notification to Grant issued in related CN Patent Application No. 202210174087.9, mailed May 16, 2022, 5 pages.
Search Report issued in related CN Patent Application No. 202210174087.9, mailed Apr. 6, 2022, 14 pages.

* cited by examiner

VIDEO GENERATION

CROSS REFERENCE TO RELATED APPLICATION

This application claims priority to Chinese Patent Application No. 202210174087.9, filed on Feb. 25, 2022, the contents of which are hereby incorporated by reference in their entirety for all purposes.

TECHNICAL FIELD

The present disclosure relates to the field of artificial intelligence, in particular to natural language processing technology, deep learning technology, computer vision technology, image processing technology, etc., and in particular to a video generation method, a method for training a neural network, a video generation apparatus, an apparatus for training the neural network, an electronic device, and a computer-readable storage medium.

BACKGROUND

Artificial intelligence is a discipline that studies how to make computers simulate certain thinking processes and intelligent behaviors (such as learning, reasoning, thinking, and planning) of human beings. It has both hardware technology and software technology. The hardware technology of artificial intelligence generally includes sensors, dedicated artificial intelligence chips, cloud computing, distributed storage, big data processing, etc. The software technology of artificial intelligence mainly includes computer vision technology, speech recognition technology, natural language processing technology, machine learning/deep learning, big data processing technology, knowledge graph technology and other major directions.

Digital content is the core foundation of the Internet. Compared with text content, video content contains richer information, is more user-friendly, and has better communication effects. With the development of hardware facilities for mobile Internet, the demand for video content has grown rapidly.

Methods described in this section are not necessarily those previously envisaged or adopted. Unless otherwise specified, it should not be assumed that any method described in this section is considered the prior art only because it is included in this section. Similarly, unless otherwise specified, the issues raised in this section should not be considered to have been universally acknowledged in any prior art.

SUMMARY

The present disclosure provides a video generation method, a method for training a neural network, a video generation apparatus, an apparatus for training the neural network, an electronic device, and a computer-readable storage medium.

According to one aspect of the present disclosure, a video generation method is provided, and includes: obtaining global semantic information and at least one local semantic information of a text, wherein the at least one local semantic information corresponds to at least one text fragment in the text: searching, based on the global semantic information, a database to obtain at least one first data corresponding to the global semantic information: searching, based on each local semantic information in the at least one local semantic information, the database to obtain at least one second data corresponding to the local semantic information; obtaining, based on the at least one first data and the at least one second data corresponding to each of the at least one local semantic information, a candidate data set; matching, based on a relevancy between each text fragment of the at least one text fragment and each candidate data in the candidate data set, target data for the at least one text fragment; and generating, based on the target data matched with each of the at least one text fragment, a video.

According to another aspect of the present disclosure, a method for training a neural network is provided. The neural network is configured to embed a plurality of received inputs to obtain a plurality of corresponding input features, and process the plurality of input features by using a self-attention mechanism. The method includes: obtaining a sample text, ground truth global semantic information of the sample text, and at least one ground truth local semantic information of the sample text, wherein the at least one ground truth local semantic information corresponds to at least one text fragment in the sample text: inputting a plurality of first sample words included in the sample text into the neural network to obtain predicted global semantic information and at least one predicted local semantic information of the sample text: calculating, based on the ground truth global semantic information, the predicted global semantic information, the at least one ground truth local semantic information and the at least one predicted local semantic information, a first loss value: obtaining a sample text fragment, positive sample data corresponding to the sample text fragment, and negative sample data corresponding to the sample text fragment: inputting a plurality of second sample words included in the sample text fragment and at least one positive image patch included in the positive sample data into the neural network to obtain a positive sample visual relevancy between the sample text fragment and the positive sample data, wherein the positive sample visual relevancy indicates a relevancy between text information of the sample text fragment and visual information of the positive sample data; inputting the plurality of second sample words and at least one negative image patch included in the negative sample data into the neural network to obtain a negative sample visual relevancy between the sample text fragment and the negative sample data, wherein the negative sample visual relevancy indicates a relevancy between the text information of the sample text fragment and visual information of the negative sample data: calculating, based on the positive sample visual relevancy and the negative sample visual relevancy, a second loss value, wherein the second loss value is negatively relevant to the positive sample visual relevancy, and is positively relevant to the negative sample visual relevancy; and adjusting, based on the first loss value and the second loss value, parameters of the neural network.

According to yet another aspect of the present disclosure, a video generation apparatus is provided, and includes: a first obtaining unit, configured to obtain global semantic information and at least one local semantic information of a text, wherein the at least one local semantic information corresponds to at least one text fragment in the text: a first searching unit, configured to search, based on the global semantic information, a database to obtain at least one first data corresponding to the global semantic information: a second searching unit, configured to search, based on each local semantic information in the at least one local semantic information, the database to obtain at least one second data corresponding to the local semantic information: a second obtaining unit, configured to obtain, based on the at least one first data and the at least one second data corresponding to each of the at least one local semantic information, a candidate data set: a matching unit, configured to match, based on a relevancy between each text fragment of the at least one text fragment and each candidate data in the candidate data set, target data for the at least one text fragment; and a generation unit, configured to generate, based on the target data matched with each of the at least one text fragment, a video.

According to yet another aspect of the present disclosure, an apparatus for training a neural network is provided. The neural network is configured to embed a plurality of received inputs to obtain a plurality of corresponding input features, and process the plurality of input features by using a self-attention mechanism. The apparatus includes: a third obtaining unit, configured to obtain a sample text, ground truth global semantic information of the sample text, and at least one ground truth local semantic information of the sample text, wherein the at least one ground truth local semantic information corresponds to at least one text fragment in the sample text: a first input unit, configured to input a plurality of first sample words included in the sample text into the neural network to obtain predicted global semantic information and at least one predicted local semantic information of the sample text: a first calculating unit, configured to calculate, based on the ground truth global semantic information, the predicted global semantic information, the at least one ground truth local semantic information and the at least one predicted local semantic information, a first loss value: a fourth obtaining unit, configured to obtain a sample text fragment, positive sample data corresponding to the sample text fragment, and negative sample data corresponding to the sample text fragment: a second input unit, configured to input a plurality of second sample words included in the sample text fragment and at least one positive image patch included in the positive sample data into the neural network to obtain a positive sample visual relevancy between the sample text fragment and the positive sample data, wherein the positive sample visual relevancy indicates a relevancy between text information of the sample text fragment and visual information of the positive sample data: a third input unit, configured to input the plurality of second sample words and at least one negative image patch included in the negative sample data into the neural network to obtain a negative sample visual relevancy between the sample text fragment and the negative sample data, wherein the negative sample visual relevancy indicates a relevancy between the text information of the sample text fragment and visual information of the negative sample data: a second calculating unit, configured to calculate, based on the positive sample visual relevancy and the negative sample visual relevancy, a second loss value, wherein the second loss value is negatively relevant to the positive sample visual relevancy, and is positively relevant to the negative sample visual relevancy; and an adjusting unit, configured to adjust, based on the first loss value and the second loss value, parameters of the neural network.

According to yet another aspect of the present disclosure, an electronic device is provided, and includes: one or more processors; a memory storing one or more programs configured to be executed by the one or more processors, the one or more programs including instructions for: obtaining global semantic information and at least one local semantic information of a text, where the at least one local semantic information corresponds to at least one text fragment in the text: searching, based on the global semantic information, a database to obtain at least one first data corresponding to the global semantic information: searching, based on each local semantic information in the at least one local semantic information, the database to obtain at least one second data corresponding to the local semantic information: obtaining, based on the at least one first data and the at least one second data corresponding to each of the at least one local semantic information, a candidate data set: matching, based on a relevancy between each text fragment of the at least one text fragment and each candidate data in the candidate data set, target data for the at least one text fragment, and generating, based on the target data matched with each of the at least one text fragment, a video.

According to another aspect of the present disclosure, a non-transitory computer readable storage medium storing computer instructions is provided, wherein the computer instructions are used to enable a computer to execute the above method.

According to the embodiments of the present disclosure, the global semantic information and the local semantic information of the text are obtained by performing multi-level understanding of the text, then data search is performed based on the multi-level semantic information to obtain candidate data, and the text fragments and the candidate data are matched based on the relevancy between the text fragments and the candidate data, so that the video which is coherent and consistent in successive content, and is matched with paragraphs and the text as a whole can be generated, thereby improving the viewing experience of users.

It should be understood that the content described in this part is not intended to identify key or important features of the embodiments of the present disclosure, nor is it used to limit the scope of the present disclosure. Other features of the present disclosure will be easily understood by the following description.

BRIEF DESCRIPTION OF DRAWINGS

The accompanying drawings illustrate the embodiments by way of example and constitute a part of the specification, and together with the written description of the specification serve to explain example implementations of the embodiments. The illustrated embodiments are for illustrative purposes only and do not limit the scope of the claims. Throughout the accompanying drawings, the same reference numerals refer to similar but not necessarily identical elements.

DETAILED DESCRIPTION OF THE EMBODIMENTS

Figure 1A:
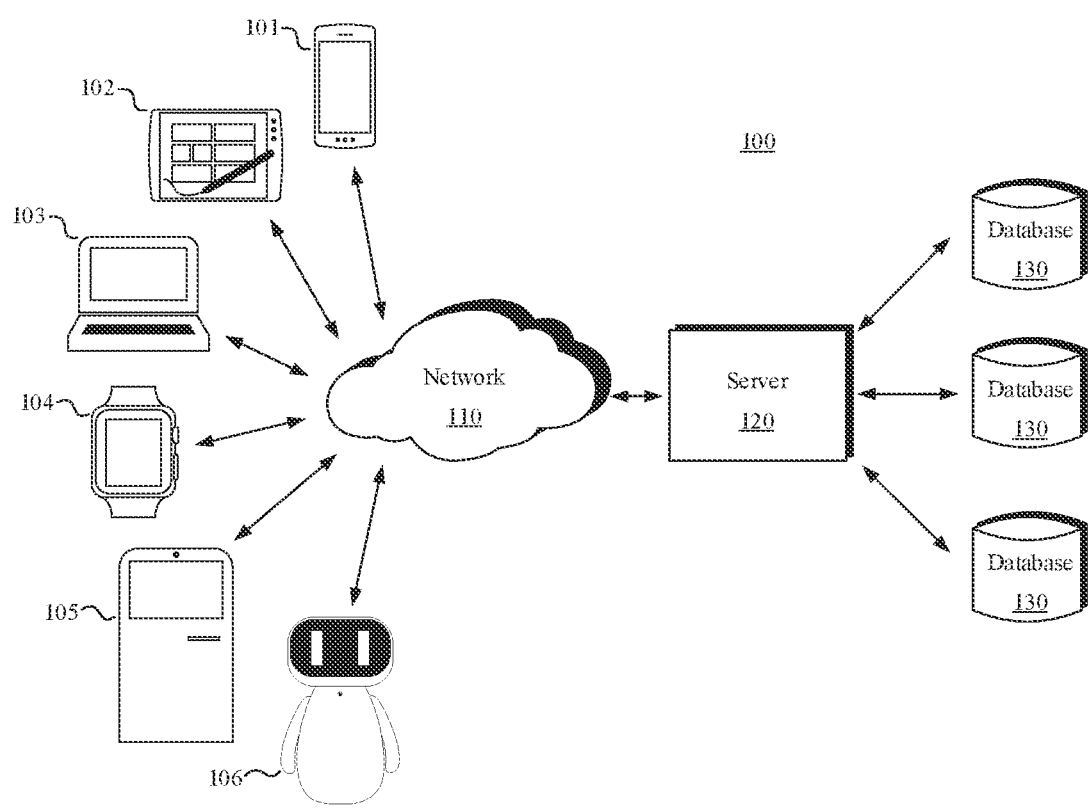
FIG. 1A illustrates a schematic diagram of an example system in which various methods described herein may be implemented, according to embodiments of the present disclosure.

The example embodiments of the present disclosure are described below with reference to the accompanying drawings, including various details of the embodiments of the present disclosure to facilitate understanding, which should be considered merely examples. Therefore, those of ordinary skill in the art should recognize that various changes and modifications may be made to the embodiments described herein without departing from the scope of the present disclosure. Similarly, for clarity and conciseness, the description of well-known functions and structures is omitted from the following description.

In the present disclosure, unless otherwise specified, the terms "first". "second" and the like are used to describe various elements and are not intended to limit the positional relationship, temporal relationship or importance relationship of these elements. These terms are only used to distinguish one element from another element. In some examples, a first element and a second element may refer to the same instance of the element, and in some cases, based on the context description, they can also refer to different instances.

The terms used in the description of the various examples in the present disclosure are only for the purpose of describing specific examples and are not intended to be limiting. Unless the context clearly indicates otherwise, if the quantity of elements is not specifically limited, the element may be one or more. In addition, the term "and/or" as used in the present disclosure covers any and all possible combinations of the listed items.

Digital content is the core foundation of the Internet. Compared with text content, video content contains richer information, is more user-friendly, and has better communication effects. With the development of hardware facilities for mobile Internet, the demand for video content has grown rapidly.

However, the efficiency of manual video production is relatively low and cannot match the growing demand for video content. Compared with manual video production, manual text creation is more efficient; and at the same time, a large amount of text or graphic content has been accumulated on the Internet. Therefore, how to automatically generate video content based on text content combined with a large number of materials on the Internet has become an urgent problem to be solved.

At present, there are three main ways to generate a video based on text content:

(1) a method based on a text-to-video editing tool: text content input by a user is first automatically converted into audio via the editing tool, and then a video is finally generated through manual operations such as dubbing, host configuration, and background image configuration;

(2) a method for generating an explanatory video using tool articles or template articles; first, a text sequence is extracted via a summary extraction tool, then image search is performed based on the text sequence, manual edition is performed with a fixed template to generate a plurality of video clips, and the clips are stitched to finally generate a video; and (3) a video generation method based on topic description text: the text is converted into semantic vectors based on a neural network model, and then a video is generated according to the semantic vectors. The method can automatically generate a video of simple scenes for short text descriptions (for example, a flock of geese are flying in the sky).

The first two methods above have the shortcomings that the degree of automation and intelligence is low, video patterns generated are relatively fixed, applicable scenarios are relatively simple, and training optimization is difficult to perform based on generated results. Although the third method can automatically generate a video from simple text, since the method directly relies on the neural network model, a generation process is difficult to control, and the authenticity and reliability of generated results are difficult to guarantee.

According to the present disclosure, in order to solve the above problems, the global semantic information and the local semantic information of text are obtained by performing multi-level understanding on the text, then data search is performed based on the multi-level semantic information to obtain candidate data, and text fragments and the candidate data are matched based on a relevancy therebetween, so that a video which is coherent and consistent in successive content, and is matched with paragraphs and the text as a whole can be generated, thereby improving the viewing experience of users.

The embodiments of the present disclosure will be described in detail below with reference to the accompanying drawings.

FIG. 1A illustrates a schematic diagram of an example system 100 in which various methods and apparatuses described herein may be implemented according to embodiments of the present disclosure. Referring to FIG. 1, the system 100 includes one or more client devices 101, 102, 103, 104, 105 and 106, a server 120, and one or more communication networks 110 coupling the one or more client devices to the server 120. The client devices 101, 102, 103, 104, 105 and 106 may be configured to execute one or more applications.

In the embodiment of the present disclosure, the server 120 may run one or more services or software applications that can execute a video generation method.

In certain embodiments, the server 120 may further provide other services or software applications that may include non-virtual environments and virtual environments. In certain embodiments, these services may be provided as web-based services or cloud services, such as being provided to users of the client devices 101, 102, 103, 104, 105 and/or 106 under a software as a service (SaaS) model.

In the configuration shown in FIG. 1A, the server 120 may include one or more components implementing functions executed by the server 120. These components may include a software component, a hardware component or their combinations that may be executed by one or more processors. The users operating the client devices 101, 102, 103, 104, 105 and/or 106 may sequentially utilize one or more client applications to interact with the server 120 so as to utilize services provided by these components. It should be understood that various different system configurations are possible, which may be different from the system 100. Therefore, FIG. 1 is an example of a system for implementing the various methods described herein, and is not intended to be limiting.

The user can configure basic options, edit text of a video to be generated, and modify full text keywords, paragraph keywords, etc. generated by a neural network by using the client devices 101, 102, 103, 104, 105 and/or 106. The client devices may provide interfaces enabling the users of the client devices to be capable of interacting with the client devices. The client devices may further output information to the users via the interfaces. Although FIG. 1 only depicts six client devices, those skilled in the art can understand that the present disclosure may support any quantity of client devices.

The client devices 101, 102, 103, 104, 105 and/or 106 may include various types of computer devices, such as a portable handheld device, a general-purpose computer (such as a personal computer and a laptop computer), a workstation computer, a wearable device, a smart screen device, a self-service terminal device, a service robot, a gaming system, a thin client, various message transceiving devices, a sensor or other sensing devices, etc. These computer devices may run various types and versions of software applications and operating systems, such as MICROSOFT Windows, APPLE IOS, UNIX-like operating systems, and Linux or Linux-like operating systems (such as GOOGLE Chrome OS): or include various mobile operating systems, such as MICROSOFT Windows Mobile OS. IOS, Windows Phone and Android. The portable handheld device may include a cell phone, a smart phone, a tablet computer, a personal digital assistant (PDA) and the like. The wearable device may include a head-mounted display (such as smart glasses) and other devices. The gaming system may include various handheld gaming devices, gaming devices supporting the Internet and the like. The client devices can execute various different applications, such as various Internet-related applications, communication applications (such as e-mail applications), and short message service (SMS) applications, and may use various communication protocols.

The network 110 may be any type of network well known to those skilled in the art, which may use any one of various available protocols (including but not limited to TCP/IP, SNA, IPX, etc.) to support data communication. Only as examples, one or more networks 110 may be a local area network (LAN), an Ethernet-based network, a token ring, a wide area network (WAN), the Internet, a virtual network, a virtual private network (VPN), an intranet, an extranet, a public switched telephone network (PSTN), an infrared network, a wireless network (e.g., Bluetooth, WiFi), and/or any combination of these and/or other networks.

The server 120 may include one or more general-purpose computers, dedicated server computers (e.g., PC (personal computer) servers. UNIX servers, and midrange servers), blade servers, mainframe computers, server clusters, or any other suitable arrangement and/or combination. The server 120 may include one or more virtual machines running virtual operating systems, or other computing frameworks involving virtualization (e.g., one or more flexible pools of logical storage devices that may be virtualized to maintain virtual storage devices of the server). In various embodiments, the server 120 may run one or more service or software applications providing the functions described below.

A computing unit in the server 120 may run one or more operating systems including any above operating system and any commercially available server operating system. The server 120 may further run any one of various additional server applications and/or intermediate layer applications, including an HTTP server, an FTP server, a CGI server, a JAVA server, a database server, etc.

In some implementations, the server 120 may include one or more applications to analyze and merge data feeds and/or event updates received from the users of the client devices 101, 102, 103, 104, 105 and/or 106. The server 120 may further include one or more applications to display data feeds and/or real-time events via one or more display devices of the client devices 101, 102, 103, 104, 105 and/or 106.

In some implementations, the server 120 may be a server of a distributed system, or a server combined with a block chain. The server 120 may further be a cloud server, or a smart cloud computing server or smart cloud host with the artificial intelligence technology. The cloud server is a host product in a cloud computing service system to solve the defects of large management difficulty and weak business expansibility existing in traditional physical host and virtual private server (VPS) services.

The system 100 may further include one or more databases 130. In some embodiments, the databases may be used to store data and other information. For example, one or more of the databases 130 may be used to store, for example, information of audio files and video files. The databases 130 may reside at various positions. For example, a database used by the server 120 may be local to the server 120 or may be remote from the server 120 and may communicate with the server 120 over a network-based or dedicated connection. The databases 130 may be of different types. In some embodiments, the database used by the server 120 may be a relational database. One or more of these databases may respond to a command to store, update and retrieve data to and from the databases.

In certain embodiments, one or more of the databases 130 may further be used by applications to store application data. The databases used by the applications may be different types of databases, such as a key value storage base, an object storage base or a conventional storage base supported by a file system.

The system 100 of FIG. 1A may be configured and operated in various modes so that various methods and apparatuses described according to the present disclosure can be applied.

According to one aspect of the present disclosure, a video generation method is provided. The method includes: step S201, global semantic information and at least one local semantic information of a text are obtained, wherein the at least one local semantic information corresponds to at least one text fragment in the text: S202, a database is searched based on the global semantic information to obtain at least one first data corresponding to the global semantic information: S203, the database is searched based on each local semantic information in the at least one local semantic information to obtain at least one second data corresponding to the local semantic information: S204, a candidate data set is obtained based on the at least one first data and the at least one second data corresponding to each of the at least one local semantic information: S205, target data is matched for the at least one text fragment based on a relevancy between each of the at least one text fragment and each candidate data in the candidate data set; and step S206, a video is generated based on the target data matched with each of the at least one text fragment.

Therefore, the global semantic information and the local semantic information of the text are obtained by performing multi-level understanding on the text, then data search is performed based on the multi-level semantic information to obtain candidate data, and text fragments and the candidate data are matched based on a relevancy therebetween, so that a video which is coherent and consistent in successive content, and is matched with paragraphs and the text as a whole can be generated, thereby improving the viewing experience of users.

In an example embodiment, if only public figure B is included in a certain text fragment in text about public figure B participating in product launch event D of company C at time point A (and A, C, D is not included in the certain text), when searching is performed with local semantic information (for example, the keyword "public figure B") corresponding to the text fragment, obtained data may be videos that are completely irrelevant to company C, product launch event D, or time point A, such as a viral entertainment video of the public figure B or an advertisement in which the public Figure B endorses a product of another company. If such data is used as a target video matched with the text fragment, the finally generated video may be not matched with and violate the overall content of the text objectively. If only video or image data that is obtained by searching based on the global semantic information is used, obtained candidate data may be insufficient to generate a video. Even if the candidate data is sufficient, the finally generated video may have simplex content, and have a low relevancy with each text fragment objectively. For example, a text fragment in the text is about historical event E described by public figure B when participating in product launch event D, and historical event E is not the global semantic information of the text, so that videos or images relevant to historical event E cannot be found and thus cannot be matched as target data for the text fragment.

In addition, by matching the target data for the text fragment based on the relevancy between the text fragment and the candidate data, it can be ensured that the target data is not only relevant to keywords of the corresponding text fragment (otherwise, the above objective incompatibility may also occur), but is related to the whole text fragment.

According to some embodiments, before starting to convert the text to the video, a user may set basic configuration options via an application terminal.

In some embodiments, the user may configure a text to speech (TTS) function, including whether to enable the text to speech function, the timbre, volume and speech rate of text to speech, etc.

In some embodiments, the user may configure background music, including whether to add background music, the type of background music, etc.

In some embodiments, the user may configure a manner of video generation, including fully automatic video generation, human-computer interaction-assisted video generation, etc.

In some embodiments, the user may configure a manner for training a unified modal neural network, including whether to perform neural network optimization training based on user feedback data, etc.

In some embodiments, the user may set the type of the text to be converted. The type of the text to be converted may include text documents, content pages containing graphic content, search keywords or search questions, entity words, etc. The user may select one or more of the above types of text for video generation. On the basis of setting the type of the text to be converted, the user may further set specific text to be converted corresponding to the above types by giving specific text documents, page URL addresses, specific search keyword text or search question text, specific entity word text, etc.

In some embodiments, the user may configure one or more of the above basic configuration options.

According to some embodiments, the text used to generate the video may be obtained based on the text to be converted.

In some embodiments, in response to determining that the text to be converted is a text document, the text may be obtained by reading text content in the text document selected by the user directly.

In some embodiments, in response to determining that the text to be converted is a content page containing graphic content, such as a page containing news articles, knowledge articles, and experience articles, a page URL address selected by the user may be read and parsed with an open source web page parsing tool (such as HTML Parser), so as to obtain main text and image content of the page, and obtain Meta tag information of the page, such as the title, body, paragraph, bold, image-text position relationship, and table.

In some embodiments, in response to determining that the text to be converted is search keywords or search questions, a plurality of search results may be obtained based on the search keywords or search questions, and then a page URL address of each search result is read and parsed with the open source web page parsing tool (such as HTML Parser), so as to obtain a main text and image content of a page, and obtain Meta tag information of the page, such as the title, body, paragraph, bold, image-text position relationship, and table. A search engine and database used to obtain the search results may be set according to actual needs, which is not limited here.

In some embodiments, after the plurality of search results are obtained primarily, non-content pages such as advertisements in the search results may be filtered out first, and pages that have a high relevancy to the search keyword or search question and have richer image or video materials may be selected from the remaining pages for the above processing.

In some embodiments, in response to determining that the text to be converted is entity words, a corresponding encyclopedia entry page may be obtained based on the entity words, and then a page URL address of the above encyclopedia entry page may be read and parsed with the open source web page parsing tool (such as HTML. Parser), so as to obtain the main text and the image content of the page, and obtain Meta tag information of the page, such as the title, body, paragraph, bold, image-text position relationship, and table. The entity words are also named entities, including names of persons, institutions, places, and all other entities identified by names.

According to some embodiments, after the text is obtained, the trained unified modal neural network may be used to process the text to obtain various types of information in the text.

Figure 1B:
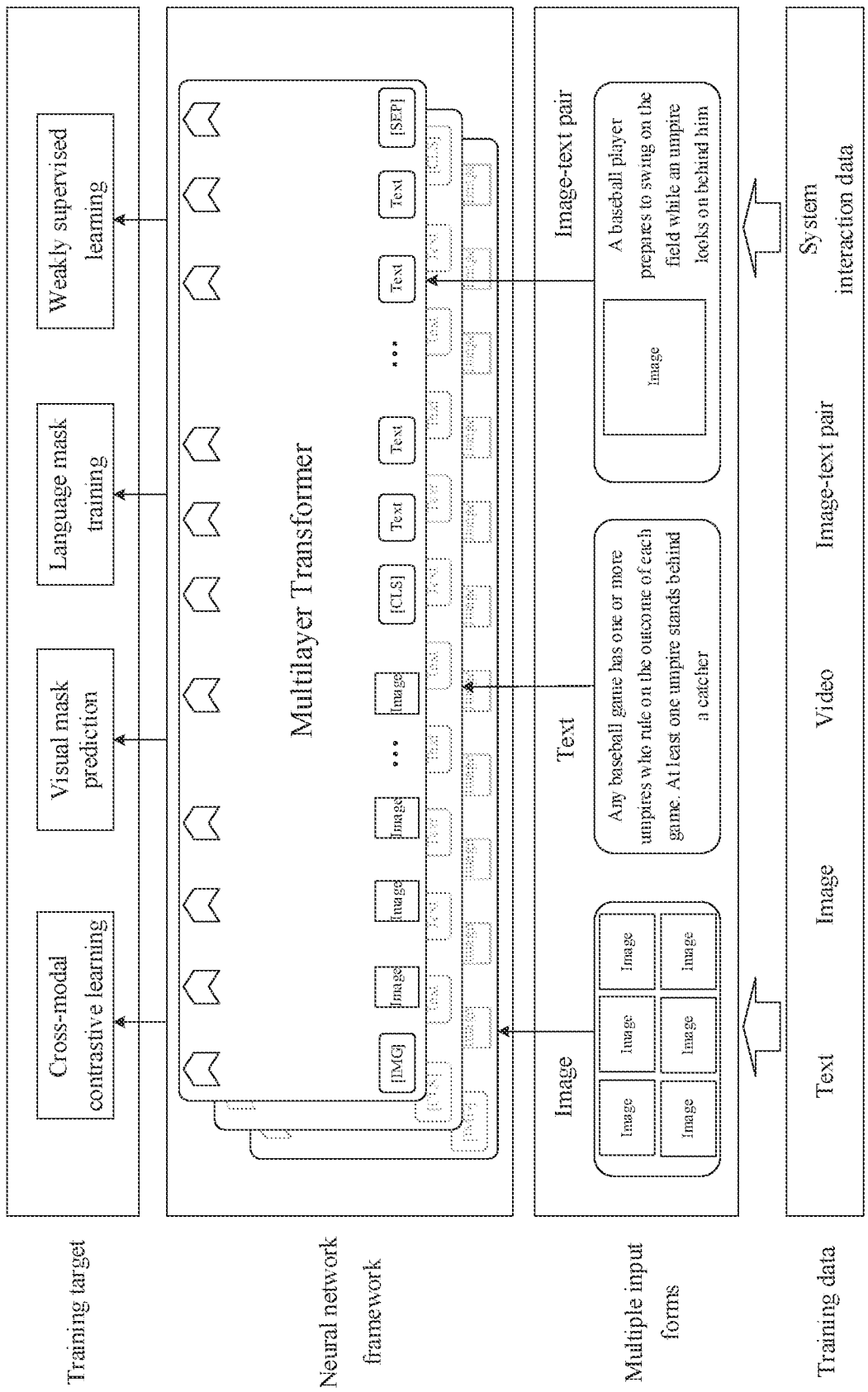
FIG. 1B illustrates a schematic diagram of a unified modal neural network according to an embodiment of the present disclosure.

The unified modal neural network is a neural network model that can uniformly process a plurality of modal inputs. The unified modal neural network can be used to complete text classification (keyword extraction), text information extraction, calculation of a relevancy between text and images or videos, text-based image or video generation, etc. As shown in FIG. 1B, the main part of the unified modal neural network is composed of a multilayer Transformer, and other network structures may be coupled after the multilayer Transformer according to different downstream tasks. The unified modal neural network may receive a text input, an image input, an image-text pair input, etc., and embed the inputs to obtain corresponding text features or image features for input into the multilayer Transformer, so that a comprehensive semantic representation output by the multilayer Transformer is obtained.

Specifically, a text input W is firstly transformed into a word sequence $W=\{[CLS], w_1, \ldots, w_n, [SEP]\}$ via word segmenting, and then a context-dependent semantic representation is obtained via the multilayer Transformer. An image input I' forms an image input sequence $V=\{[IMG], v_1, \ldots, v_t\}$ by dividing an image into a plurality of patches, and then vectorizing the image patches, and a visual semantic representation is obtained in the similar way via the multilayer Transformer. Finally, for a text-image pair input (V, W), text and visual input sequences are concatenated to form V, $W=\{[IMG], v_1, \ldots, v_t, [CLS], w_1, \ldots, w_n, [SEP]\}$, and a cross-modal semantic representation is obtained also via the multilayer Transformer.

[CLS]. [IMG], [SEP], etc. above are special symbols that are input to the Transformer-based neural network. [CLS] and [IMG] may be used to extract overall semantic representations of the text sequence and the image sequence, respectively, and [SEP] may be used as a segmenting indication between a plurality of inputs.

According to some embodiments, the tasks such as obtaining the global semantic information and the local semantic information based on the text, calculating the relevancy between the text fragment and image or video data, and extracting summaries are performed by using the trained unified modal neural network, so that the text features and the visual features used in the tasks are located in the same semantic space, thus establishing an association relationship between the tasks. Therefore, the global semantic information and the local semantic information output by the neural network are more suitable for the application scenario, the accuracy of the obtained relevancy and summary is improved, the generated video and text content are highly consistent, and the target data of the generated video are logically related and not inconsistent.

In some embodiments, frames need to be sampled first for a video input, and then the frames are converted into a sequence of image patches. A frame sampling interval may be determined based on, for example, currently available computing power. A small frame sampling interval may be used when the available computing power is abundant, and a large frame sampling interval may be used when the available computing power is scarce.

In some embodiments, the unified modal neural network may be trained in various ways, such as cross-modal contrastive learning, visual mask prediction, language mask prediction, and weakly supervised learning may also be performed using user interaction data. How to train the unified modal neural network will be described in detail below.

Figure 2:
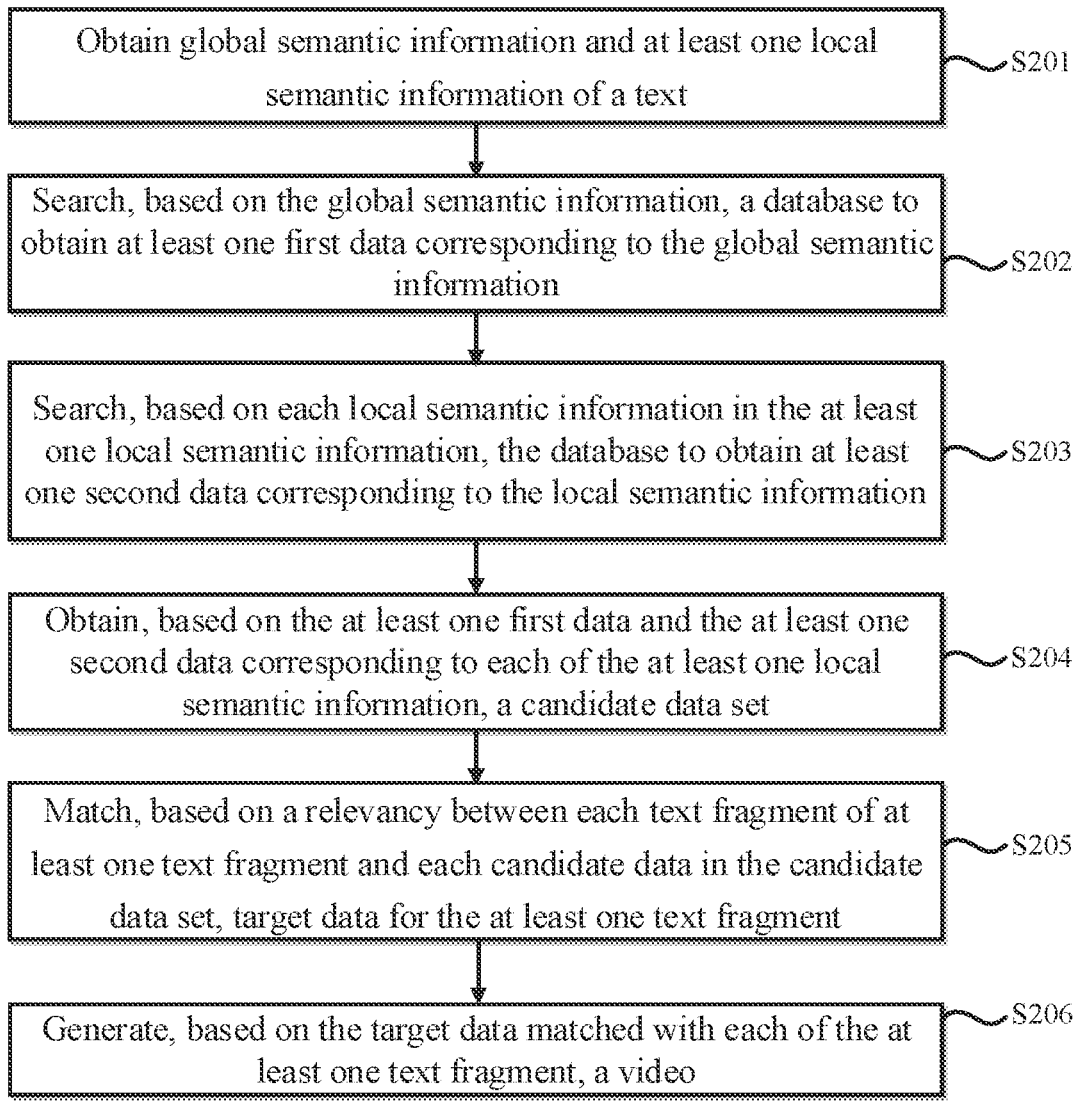
FIG. 2 illustrates a flowchart of a video generation method according to an example embodiment of the present disclosure.
Figure 3:
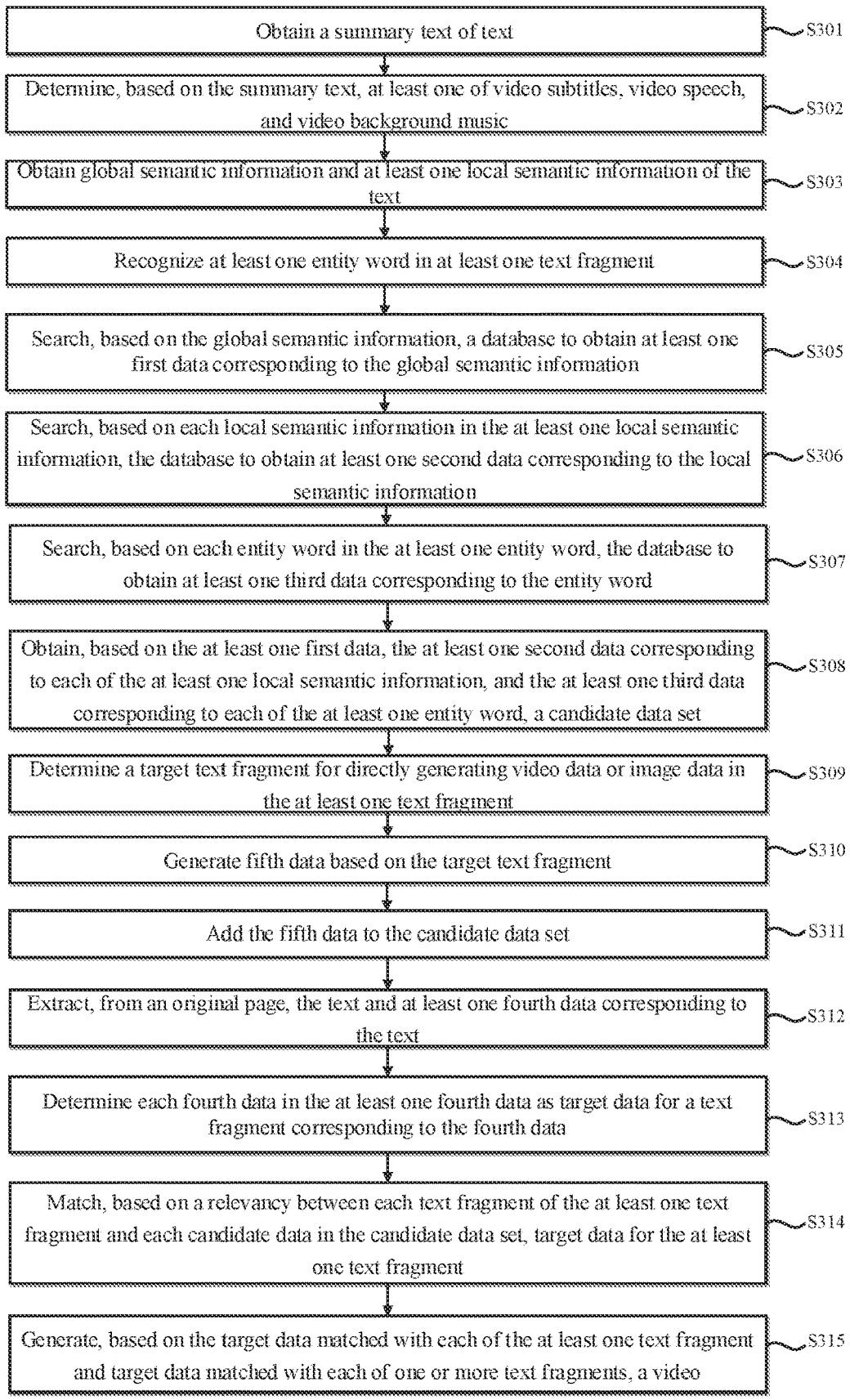
FIG. 3 illustrates a flowchart of a video generation method according to an example embodiment of the present disclosure.

In some embodiments, for a long text, a video generated directly from the whole text may also be relatively long, which is not conducive to the rapid consumption of the video. Therefore, in order to make a short video with concise content, a summary of the text may be extracted. As shown in FIG. 3, the video generation method may further include: step S301, a summary text of the text is obtained. It can be understood that the operations and effects of steps S303. S305, S306, S308, S314 and S315 in FIG. 3 are the same as those of steps S201 to S206 in FIG. 2, which will not be repeated here. The summary of the text may be used as subtitles of a video, and may be further used to generate speech of the video, as will be described later. In other embodiments, a short text may be directly used as a summary, or be refined by using a neural network, which is not limited here.

In some embodiments, the summary text of the text may be obtained by using a unified modal neural network. In an example embodiment, the summary text may be obtained by extraction. By inputting the text into the unified modal neural network at the same time in the unit of sentence, a judgment result of whether each sentence is a summary may be obtained (for example, [CLS] is set before each sentence, and whether the sentence belongs to the summary text is determined based on an output feature corresponding to [CLS] of each sentence). It can be understood that the summary text of the text is also obtained by using other methods, which is not limited here.

According to some embodiments, the user may manually modify the summary. Step S301, obtaining the summary text of the text by using the unified modal neural network may further include: in response to receiving a user input indicating to modify the summary text, at least the summary text is modified based on the user input. In addition, user-modified summaries may be used as sample data for further training and optimizing the neural network, as will be described later.

According to some embodiments, the video generation method may further include: step S302, at least one of video subtitles, video speech, and video background music is determined based on the summary text.

In some embodiments, the summary text may be further segmented to obtain the video subtitles.

In some embodiments, the text or summary text may be converted to video speech through a text to speech (TTS) technology. Specifically, the content type of the text (for example, narrative, comment, lyrical, etc.) may be obtained first based on the text or summary text, and the corresponding tone, timbre, volume, speech rate, etc. of text to speech may be called based on the content type.

In some embodiments, the style of the video background music may be determined based on the content type of the summary text (for example, narrative, commentary, lyrical, etc., or for example, sports, news, entertainment, etc.), and corresponding music in a music library is determined. Optionally, the length of the video speech may also be used as a constraint to select music with a similar duration as the video background music.

In some embodiments, in response to determining that the user configures the manner of video generation as human-computer interaction-assisted video generation, the user may also set the timbre, volume and speech rate of text to speech according to actual needs.

In some embodiments, in response to determining that the user configures the manner of video generation as human-computer interaction-assisted video generation, the user may configure the background music, including whether to add the background music, the type of the background music, etc. Optionally, different styles of background music may also be provided for the user so that the user may choose the background music according to actual needs.

It can be understood that, in some embodiments, the generated video may include one or more of the video subtitles, video speech, and video background music, which is not limited here.

When the video is generated, in order to make the generated video have rich visual elements, it is a key step to supplement visual material data such as videos and images.

In step S303, global semantic information and at least one local semantic information of the text are obtained. At least one local semantic information corresponds to at least one text fragment in the text.

In some embodiments, the global semantic information may be, for example, full-text keywords of the text, and the local semantic information may be, for example, keywords of the corresponding text fragment. The text fragment may be, for example, a paragraph in the text, a sentence in the text, or a text fragment obtained by dividing the text with other granularities or determined in the text in other ways.

In some embodiments, keyword prediction may be implemented based on a classification task using the unified modal neural network. By predetermining a keyword list as the "category" that the classification task may predict, and training the neural network with corresponding samples, the neural network may output a plurality of category labels based on the input text, and each of the plurality of category labels corresponds to a keyword in the keyword list. In other embodiments, the neural network may perform fusion processing on at least one output feature output by the Transformer layers to extract the comprehensive semantic representation of the text, and then keywords corresponding to the input text are generated directly based on the representation. It can be understood that the above are only two example methods for determining text keywords, and the text keywords can also be obtained in other manners via the neural network.

In some embodiments, the global semantic information may be obtained, for example, by inputting the whole text into the unified modal neural network. In some embodiments, the at least one local semantic information may be obtained, for example, by directly inputting the whole text into the unified modal neural network, or by inputting the text fragments into the unified modal neural network. In other embodiments, the full text may be input into the neural network, and the neural network may perform fusion processing on the output features, corresponding to the text fragments, output by the Transformer layers so as to extract the comprehensive semantic representation of the text fragments, and then directly generate the local semantic information of the text fragments based on the representation.

According to some embodiments, step S303, obtaining the global semantic information and the at least one local semantic information of the text may include: in response to receiving a user input indicating to modify the global semantic information, the global semantic information is modified based on the user input. In addition, the user-modified global semantic information may be used as sample data for further training and optimizing the neural network, as will be described later.

According to some embodiments, step S303, obtaining the global semantic information and the at least one local semantic information of the text may include: in response to receiving a user input indicating to modify the at least one local semantic information, the at least one local semantic information is modified based on the user input. In addition, the user-modified local semantic information may be used as sample data for further training and optimizing the neural network, as will be described later.

Therefore, by receiving the user input from the user, the global semantic information and the local semantic information can be adjusted, so that data having a higher relevancy with the whole text and the text fragments may be obtained subsequently by searching based on the global semantic information and the local semantic information. In addition, the user input may be used as interaction data to optimize the neural network.

According to some embodiments, the video generation method may further include: step S304, at least one entity word is recognized in the at least one text fragment. In one example embodiment, an entity word list may be predetermined, and entity words may be recognized in the text fragments according to the entity word list.

In some embodiments, in step S305, the global semantic information of the text may be used as a search word to search the database to obtain at least one first data. The first data may be picture data or video data obtained by searching based on the global semantic information.

According to some embodiments, step S305, searching, based on the global semantic information, the database to obtain the at least one first data corresponding to the global semantic information may include, the database is searched to obtain the at least one first data based on the global semantic information and a title of the text.

In some embodiments, the global semantic information and the title of the text may be used as search terms to search the database to obtain the at least one first data.

In some embodiments, searching may also be performed in conjunction with the context, for example, the whole text or selected parts of the text may be used as context information. In one example, the burden on the search engine or database may be increased if all the context information is used as search terms, so that results may be filtered by using the context information after searching is performed with the search terms. Therefore, the relevancy between the search results and the text can be improved with almost the same quantity of computing resources.

In some embodiments, the database may be, for example, a general search engine, or a specific material website or material database. The manner of obtaining the at least one first data may specifically include searching the entire network online via the search engine, searching the specific material website, or searching an offline material database. It can be understood that the applied search engine may be selected based on actual needs, which is not limited here.

In some embodiments, in step S306, the local semantic information of each text fragment may be used as a search keyword to search the database to obtain at least one second data. The second data may include pictures or videos obtained by searching based on the local semantic information of each text fragment.

According to some embodiments, step S306, that is, the database is searched to obtain the at least one second data corresponding to the local semantic information based on each local semantic information in the at least one local semantic information may include: the database is searched to obtain the at least one second data based on each local semantic information in the at least one local semantic information and a text fragment corresponding to the local semantic information. Therefore, by using the corresponding text fragments during searching, the relevancy between the search results and the text fragments can be improved.

In some embodiments, the local semantic information and the title of the text may be used as search terms to search the database to obtain the at least one second data.

According to some embodiments, searching, based on each local semantic information in the at least one local semantic information and the text fragment corresponding to the local semantic information, the database to obtain the at least one second data may include: the database is searched based on each local semantic information in the at least one local semantic information to obtain a plurality of second search results; and the plurality of second search results are filtered based on at least one of the text fragment corresponding to the local semantic information and the text to obtain the at least one second data.

In some embodiments, the local semantic information of each text fragment may also be used as a search keyword to search the database to obtain at least one second search result first; and then, the second search result is filtered based on a relevancy between the text fragment corresponding to the local semantic information and the second search result, so that the at least one second data is obtained. Since it may take a lot of computing resources to use the text fragments directly as search terms, by filtering the result with context information after searching is performed with search terms, the relevancy between the search result and the text can be improved with minimal computing resources, and the obtaining efficiency of materials can be improved.

In some embodiments, the manner for obtaining the at least one second data or at least one second search result may specifically include searching the entire network online via the search engine, searching the specific material website or searching the offline material database. It can be understood that the applied search engine may be selected based on actual needs, which is not limited here.

According to some embodiments, as shown in FIG. 3, the video generation method may further include: step S307, based on each entity word in the at least one entity word, the database is searched to obtain at least one third data corresponding to the entity word. Step S308, that is, a candidate data set is obtained based on the at least one first data and the at least one second data corresponding to each of least one local semantic information, may include: the candidate data set is obtained based on the at least one first data, the at least one second data corresponding to each of least one local semantic information, and the at least one third data corresponding to each of the at least one entity word. Therefore, by searching to obtain the third data based on the entity words, material data used for generating a video can be further enriched, and the candidate data set may include data directly relevant to entity words appearing in the text.

In some embodiments, in step S307, on the basis of obtaining the entity words of each text fragment as described above, the data is further searched to obtain the at least one third data with each entity word as a search keyword. The third data may include pictures or videos obtained by searching based on the entity words of each text fragment.

According to some embodiments, step S307, that is, the database is searched based on each entity word in the at least one entity word to obtain the at least one third data corresponding to the entity word, may include: the database is searched based on each entity word in the at least one entity word and the text fragment where the entity word is located to obtain the at least one third data. Therefore, by using the corresponding text fragments during searching, the relevancy between the search results and the text fragments can be improved.

In some embodiments, the entity word of each text fragment and the corresponding text fragment may be used as search keywords to search the database to obtain the at least one third data.

According to some embodiments, searching, based on each entity word in the at least one entity word and the text fragment where the entity word is located, the database to obtain the at least one third data corresponding to the entity word may include: the database is searched based on each entity word in the at least one entity word to obtain a plurality of third search results; and the plurality of third search results are filtered based on at least one of the text fragment where the entity word is located and the text to obtain the at least one third data.

In some embodiments, the entity word of each text fragment may also be used as a search keyword to search the database to obtain at least one third search result first; and then, the third search result is filtered based on a relevancy between the text fragment corresponding to the entity word and the third search result, so that the at least one third data is obtained. Since it may take a lot of computing resources to use the text fragments directly as search terms, by filtering the result with context information after searching is performed with search terms, the relevancy between the search result and the text can be improved with minimal computing resources, and the obtaining efficiency of material data can be improved.

In some embodiments, the manner of obtaining the at least one third data or at least one third search result may specifically include searching the entire network online via the search engine, searching the specific material website or searching the offline material database. It can be understood that the applied search engine may be selected based on actual needs, which is not limited here.

In one example, the obtained candidate data set includes the at least one first data corresponding to the global semantic information, the at least one second data corresponding to each of the at least one local semantic information, and the at least one third data corresponding to each of the at least one entity word. Through the above method, rich image data and video data can be obtained at three different levels, from global to local to words.

While the image data and video data are obtained, relevant text information such as titles and description information of the image data and video data can also be obtained, so as to screen the data later and provide richer information in the process of matching candidate data and text content.

Figure 4:
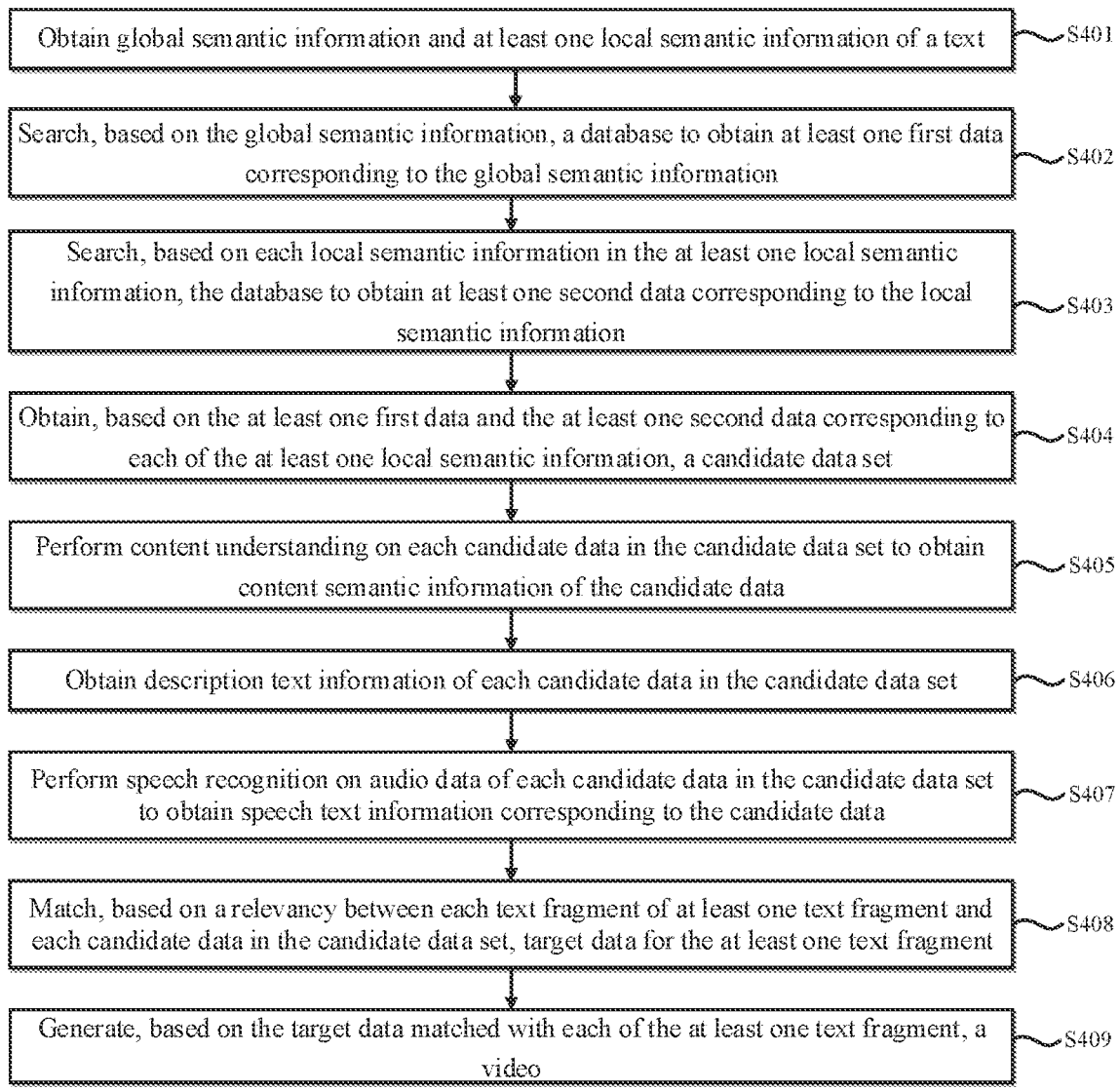
FIG. 4 illustrates a flowchart of a video generation method according to an example embodiment of the present disclosure.

According to some embodiments, as shown in FIG. 4, the video generation method may further include: step S405, content understanding is performed on each candidate data in the candidate data set to obtain content semantic information of the candidate data: step S406, description text information of each candidate data in the candidate data set is obtained; and step S407, speech recognition is performed on audio data of each candidate data in the candidate data set to obtain speech text information corresponding to the candidate data. Therefore, richer multimodal information of the candidate data can be obtained, and used to calculate a relevancy with the text fragments in the matching process, as will be described later. The operations and effects of steps S401 to S404 and steps S408 and S409 in FIG. 4 are similar to those of steps S201 to S206 in FIG. 2 respectively, which will not be repeated here.

According to some embodiments, the content understanding may include at least one of text recognition and entity recognition. In one example, text recognition may be performed on the video data or image data based on visual understanding technology tools, including subtitles, titles, bullet screens, etc. In another example, object detection may be used for entity recognition, such as public figure recognition, location recognition, and flag recognition. Therefore, a content understanding result can provide richer content information in the candidate data, and improve the accuracy of the relevancy between the text fragments and the candidate data.

According to some embodiments, speech recognition may be performed on the audio data in the candidate data by using speech recognition technology to obtain the corresponding speech text information. Therefore, the speech recognition result can provide richer content information in the candidate data, and improve the accuracy of the relevancy between the text fragments and the candidate data.

Back to FIG. 3. According to some embodiments, as shown in FIG. 3, step S308, obtaining the candidate data set based on the at least one first data and the at least one second data corresponding to each of the at least one local semantic information, includes: the at least one first data and the at least one second data corresponding to each of the at least one local semantic information are filtered based on a first target filtering rule to obtain a plurality of data to be segmented: each of the plurality of data to be segmented is segmented based on a target segmenting rule to obtain a plurality of data fragments; and the plurality of data fragments are filtered based on a second target filtering rule to obtain the candidate data set. Therefore, by filtering, segmenting the obtained data and further filtering the segmented data, irrelevant content or content not suitable for use as material data in the candidate data set can be reduced, and then the amount of calculation during relevancy calculation and matching can be reduced.

In some embodiments, the first target filtering rule may be, for example, filtering videos of a specific type or meeting a specific condition, such as a video with a single scene, a video with few views, or a video with a low user rating.

In some embodiments, the data to be segmented, that is, video data obtained after filtering, may be segmented first to obtain the plurality of data fragments (that is, video fragments). Specifically, the video may be segmented based on transitions or semantic information of video frames. On the basis that the plurality of data fragments are obtained, some specific scene fragments (for example, small scene changes) may be further filtered, and only video fragments relevant to the text content are retained as candidate data.

In some embodiments, the second target filtering rule may be, for example, filtering away fragments such as intros, endings, and transitions.

When the first data or the second data is an image, the first data or the second data may not be filtered or segmented. In some embodiments, the above steps may also be applied to the third data obtained by searching based on the entity words.

It can be understood that the above embodiments are only examples, and the first target filtering rule and the second target filtering rule can be set according to requirements, so that the obtained candidate data can be used as material data for generating the video.

According to some embodiments, as shown in FIG. 3, the video generation method may further include: step S309, a target text fragment for directly generating video data or image data is determined in the at least one text fragment: step S310, fifth data is generated directly based on the target text fragment by using the unified modal neural network, where visual content of the fifth data is relevant to the target text fragment; and step S311, the fifth data is added to the candidate data set.

In some embodiments, the pre-trained unified modal neural network has text-to-image or text-to-video generation based on artificial intelligence capabilities, so that the unified modal neural network may be used to directly generate images or videos that are consistent with the content described by the target text fragment, that is, the fifth data. It can be understood that one or more of fifth data may be generated based on one target text fragment, which is not limited here. Therefore, the image data and video data as materials can be further enriched by using the above method, and appropriate visual material data can be provided when there is no corresponding data in the database, thereby avoiding the situation where there is no available material data.

In an example embodiment, if the target text fragment is "there are five apples on the plate", image data reflecting "there are five apples on the plate" may be generated directly.

According to some embodiments, generating the fifth data directly may include: an entity word is recognized in the target text fragment; and the fifth data is generated directly based on the entity word by using the unified modal neural network.

In some embodiments, the entity word used to generate the fifth data directly may be an entity object, for example, a place of interest, a portrait of a public figure, a logo of an institution, etc. It can be understood that one or more of fifth data may be generated based on one entity word, which is not limited here.

In some embodiments, the local semantic information and entity words of the text fragments may be searched first, and when it is determined that there are few search results, the fifth data may be generated by using the above method. In other embodiments, data search and data generation may also be performed at the same time to obtain richer material data, and then the material data is filtered based on the quality of the material data or a relevancy between the material data and the corresponding text fragment. It can be understood that the user may select either the found data or the generated fifth data, which is not limited here.

In some embodiments, when it is determined that the fifth data generated based on the corresponding text fragment (for example, a text fragment describing a specific object) may have better quality, the candidate data may also be obtained directly based on the materials.

It can be understood that the current text-to-video generation method based on the artificial intelligence capabilities has a poor effect in generating long videos, so the method can be used to generate shorter fifth data, and the fifth data may not be segmented, filtered or the like.

In one example, the obtained candidate data set may include the at least one first data based on the global semantic information, the at least one second data based on each local semantic information, the at least one third data obtained based on each entity word, and the fifth data generated based on the target text fragment.

According to some embodiments, as shown in FIG. 3, the video generation method may further include: step S312, the text and one or more of fourth data corresponding to the text are extracted from an original page. The one or more of fourth data correspond to one or more text fragments, different from the at least one text fragment, in the text.

In some embodiments, the candidate data may further include videos and images presented in the original page where the text is located (i.e., text to be converted), that is, the fourth data. The fourth data may be obtained by extracting the videos and the images in the original page. Through the above method, image data and video data directly relevant to the text and the text fragments may be obtained.

According to some embodiments, as shown in FIG. 3, the video generation method may further include: step S313, each of the one or more of fourth data is determined as target data for the text fragment corresponding to the fourth data. Therefore, by using data, having a highest relevancy with a text fragment, in an original document as the target data matched with the text fragment, the material data may be richer, the number of text fragments needing matching is reduced, and the video generation speed is increased.

In step S314, target data is matched for the at least one text fragment based on a relevancy between each of the at least one text fragment and the corresponding candidate data in the candidate data set.

According to some embodiments, the relevancy between the text fragment and the candidate data may include a visual relevancy between text information of the text fragment and visual information of the corresponding candidate data. The visual relevancy may be determined based on the input text fragment and the input candidate data by using the unified modal neural network.

In some embodiments, in step S314, the neural network may be used to calculate the visual relevancy between each text fragment and the corresponding candidate data, so as to obtain a visual relevancy matrix of the at least one text fragment and the candidate data in the candidate data set, and then the target data is matched for each text fragment according to an optimization strategy.

Figure 5:
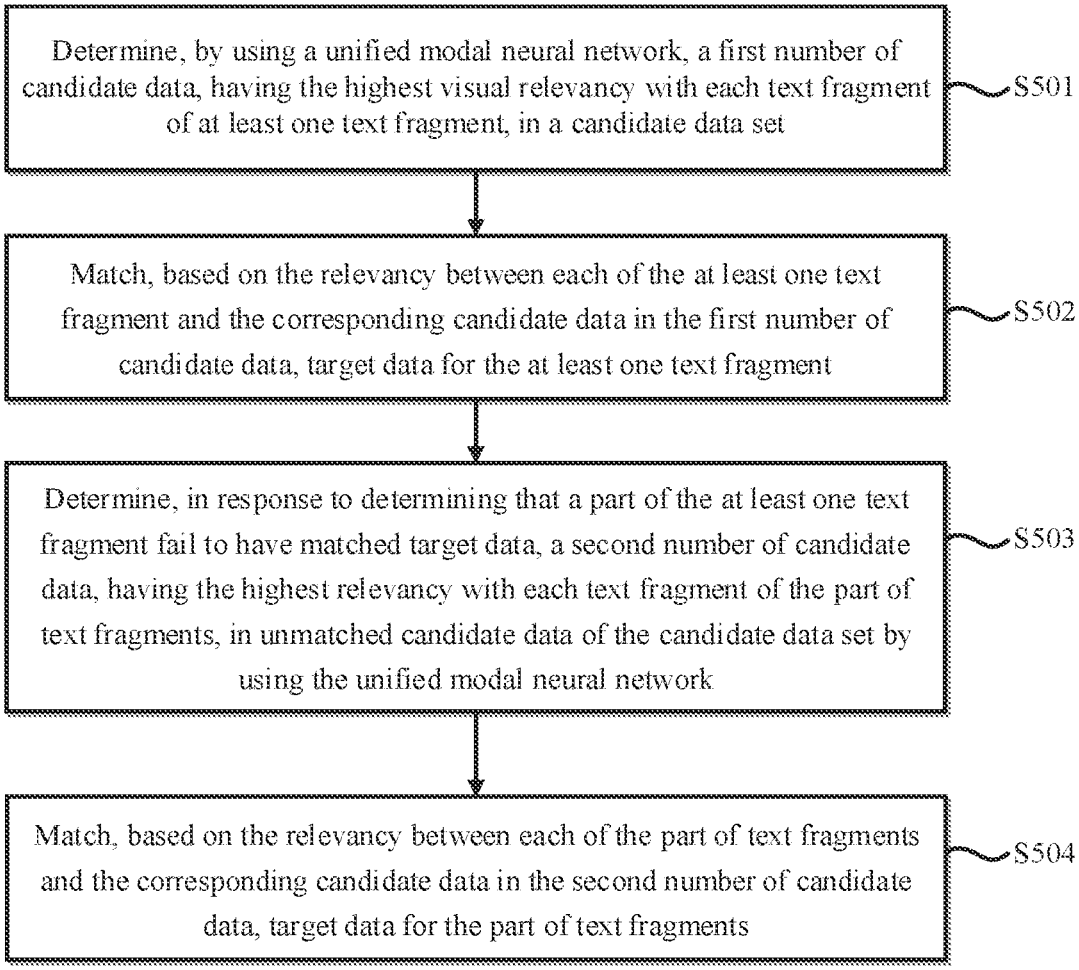
FIG. 5 illustrates a flowchart of matching target data for at least one text fragment according to an example embodiment of the present disclosure.

According to some embodiments, as shown in FIG. 5, step S314, matching the target data for the at least one text fragment, may include: step S501, a first number of candidate data, having the highest visual relevancy with each text fragment in the at least one text fragment, in the candidate data set are determined by using the unified modal neural network; and step S502, the target data is matched for the at least one text fragment based on a relevancy between each of the at least one text fragment and the corresponding candidate data in the first number of candidate data. Therefore, by first determining the first number of candidate data having the highest visual relevancy with each text fragment, and then globally matching the target data in the corresponding candidate data for each text fragment, the complexity of the matching process can be reduced, and the matching speed can be increased.

In some embodiments, image features of the candidate data and text features of the text fragments may be mapped into the same semantic space using the neural network, so that the first number of candidate data having the highest visual relevancy with each text fragment may be determined directly by using a hash-based method instead of calculating a visual relevancy between each text fragment and the corresponding candidate data, thereby significantly reducing the computing amount of the matching process and improving the matching speed. It can be understood that the value of the first number can be set according to the performance requirements of the neural network and the requirements for matching accuracy, which is not limited here.

In some embodiments, the visual relevancy may be a relevancy between a contextual text fragment and the candidate data. The contextual text fragment may include one or more preceding text fragments or corresponding local semantic information/entity words, and one or more following text fragments or corresponding local semantic information/entity words. In an example embodiment, a paragraph formed by a current text fragment, the preceding text fragment and the following text fragment, and the candidate data may be input into the neural network to obtain a visual relevancy between the current text fragment and the candidate data. In this way, the target data matched with adjacent text fragments can also be related, and in the final generated video, two adjacent video fragments or images can be consistent. In an example embodiment, a first text fragment describes entering a restaurant, a second text fragment immediately after the first text fragment describes an ordering scene, and a third text fragment immediately after the second text fragment describes a scene of talking in the restaurant. By calculating a visual relevancy in combination with the context, target material data matched with the three text fragments may include restaurants with similar scenes (for example, all are fast food restaurants, French restaurants, tea restaurants, etc.).

According to some embodiments, the visual relevancy may be determined based on the input text fragment, the local semantic information corresponding to the input text fragment, and the input candidate data by using the unified modal neural network. Therefore, the target data matched with the text fragment can be highly matched with corresponding keywords on the basis of being relevant to the text fragment as a whole, which ensures that the selected target data can highlight the key content of the text fragments.

According to some embodiments, as for a text fragment including one or more entity words, a visual relevancy may be determined based on the text fragment, the one or more entity words, and the input candidate data by using the unified modal neural network. Therefore, the target data matched with the text fragment can be highly matched with the corresponding entity words on the basis of being relevant to the text fragment as a whole, thereby avoiding that the selected target data are matched with the text fragment as a whole but entities included in the selected target data are quite different from entities appearing in the text fragment.

After the candidate data corresponding to each text fragment is obtained, the target data may be matched for each text fragment.

In some embodiments, matching may be performed with a target optimization strategy. The target optimization strategy may include, for example, a greedy strategy. In one embodiment, the candidate data having the highest visual relevancy may be matched for each text fragment sequentially by using the greedy strategy. In another embodiment, the visual relevancies between all text fragments and the corresponding candidate data may be sorted in a descending order as a whole. Starting from groups with the highest visual relevancy, the candidate data in each group is determined as the target data of the text fragments in the group, and groups that contain matched candidate data or matched text fragments are skipped.

In some embodiments, the target optimization strategy may include, for example, a dynamic programming strategy. Therefore, a matching solution with the highest sum of visual relevancies between all text paragraphs and the matched target data can be obtained.

Other constraints may also be added to the matching process. In some embodiments, the duration of a video speech fragment generated based on a part, corresponding to the text fragment, of the summary text may be used as a constraint to ensure that the duration of the candidate data matched with the text fragment is basically the same as the duration of the corresponding video speech fragment. In some embodiments, a plurality of target videos may also be matched for the text fragments, and the total duration of the target videos may be constrained by the duration of the corresponding video speech fragments.

According to some embodiments, as shown in FIG. 5, step S314, matching the target data for each text fragment of the at least one text fragment may further include: step S503, in response to determining that a part of the at least one text fragment fail to have matched target data, a second number of candidate data, having the highest relevancy with each text fragment of the part of text fragments, in unmatched candidate data of the candidate data set by using the unified modal neural network; and step S504, target data is matched for the part of text fragments based on the relevancy between each of the part of text fragments and the corresponding candidate data in the second number of candidate data. Therefore, by performing second match or even multiple matches on the text fragments that fail to have matched target data after first match, it can be ensured that each text fragment has matched target data.

It can be understood that step S314 may further include more matches until each text fragment has the matched target data. According to some embodiments, step S314, matching the target data for each text fragment of the at least one text fragment may further include: in response to receiving a user input that indicates to modify the target data matched for one text fragment of the at least one text fragment to another candidate data, another candidate data is determined as the target data of the text fragment. Therefore, the target data matched for the text fragments can be modified into other candidate data according to user feedback. In addition, the user input may be used as interaction data to optimize the neural network.

According to some embodiments, step S315, generating, based on the target data matched with each of the at least one text fragment, the video may include: the video is generated based on at least one of video subtitles, video speech, and video background music, and the target data matched with each of the at least one text fragment.

In some embodiments, when the target data corresponding to the text fragments is video data, the duration of the video may not be exactly the same as the duration of the corresponding video speech fragment, so that image data may be determined from the target data matched with other text fragments, and the display duration of the image data is adjusted accordingly to ensure the alignment of the video subtitles, the video speech and the target data. It can be understood that other methods can also be used to ensure alignment, such as segmenting the target data when the duration of the target data is greater than the duration of the corresponding video speech fragment, which is not limited here.

In some embodiments, after a speech-subtitle-video timeline is obtained, the user may fine-tune an alignment result to achieve precise alignment within seconds of the text subtitles, speech, and the displayed video.

The above embodiments provide a solution for matching the target data according to the visual relevancy between the text information of the text fragments and the visual information of the candidate data. On the basis of this, a relevancy between the text information of the text fragments and information of other modalities of the candidate data may further be used to improve the accuracy of matching.

According to some embodiments, step S315, generating, based on the target data matched with each of the at least one text fragment, the video may include: the video is generated based on the target data matched with each of the at least one text fragment and the target data matched with each of the one or more text fragments. Therefore, the video can be generated by combining target data from original text (that is, the target data matched with each of the one or more text fragments) with the target data obtained by searching or generated directly (that is, the target data matched with each of the at least one text fragment).

According to some embodiments, the relevancy may further include a first semantic relevancy between the text information of each text fragment and the content semantic information of the corresponding candidate data. The first semantic relevancy may be determined based on the input text fragment and the input content semantic information by using the unified modal neural network.

According to some embodiments, the relevancy may further include a second semantic relevancy between the text information of each text fragment and the description text information of the corresponding candidate data. The second semantic relevancy may be determined based on the input text fragment and the input description text information by using the unified modal neural network.

According to some embodiments, the relevancy may further include a third semantic relevancy between the text information of each text fragment and the speech text information of the corresponding candidate data. The third semantic relevancy may be determined based on the input text fragment and the input speech text information by using the unified modal neural network.

It can be understood that one or more of the first semantic relevancy, the second semantic relevancy and the third semantic relevancy may be selected and combined with the visual relevancy to evaluate the degree of match between the text fragment and the candidate data.

In some embodiments, in step S314, the visual relevancy, the first semantic relevancy, the second semantic relevancy, and the third semantic relevancy between each of the at least one text fragment and the corresponding candidate data in the candidate data set may be calculated, a comprehensive relevancy between each text fragment and the corresponding candidate data may be obtained by fusing the semantic relevancies, and then the target data is matched for each text fragment according to the corresponding comprehensive relevancy.

In some embodiments, in step S501, the first number of candidate data having the highest visual relevancy with each text fragment may be determined by using the unified modal neural network, and then in step S502, the target data may be matched for each text fragment based on the comprehensive relevancy between the text fragment and the candidate data.

It can be understood that the above embodiment is only an example of performing matching with the above relevancies, and other methods can also be used to perform matching with the above relevancies. For example, the first number of candidate data may be determined for each text fragment based on the visual relevancy, the candidate data may be screened based on the first semantic relevancy, the second semantic relevancy, the third semantic relevancy or a combination thereof, and then the target data matched with the text fragment are determined from the screened candidate data, which is not limited here.

Figure 6:
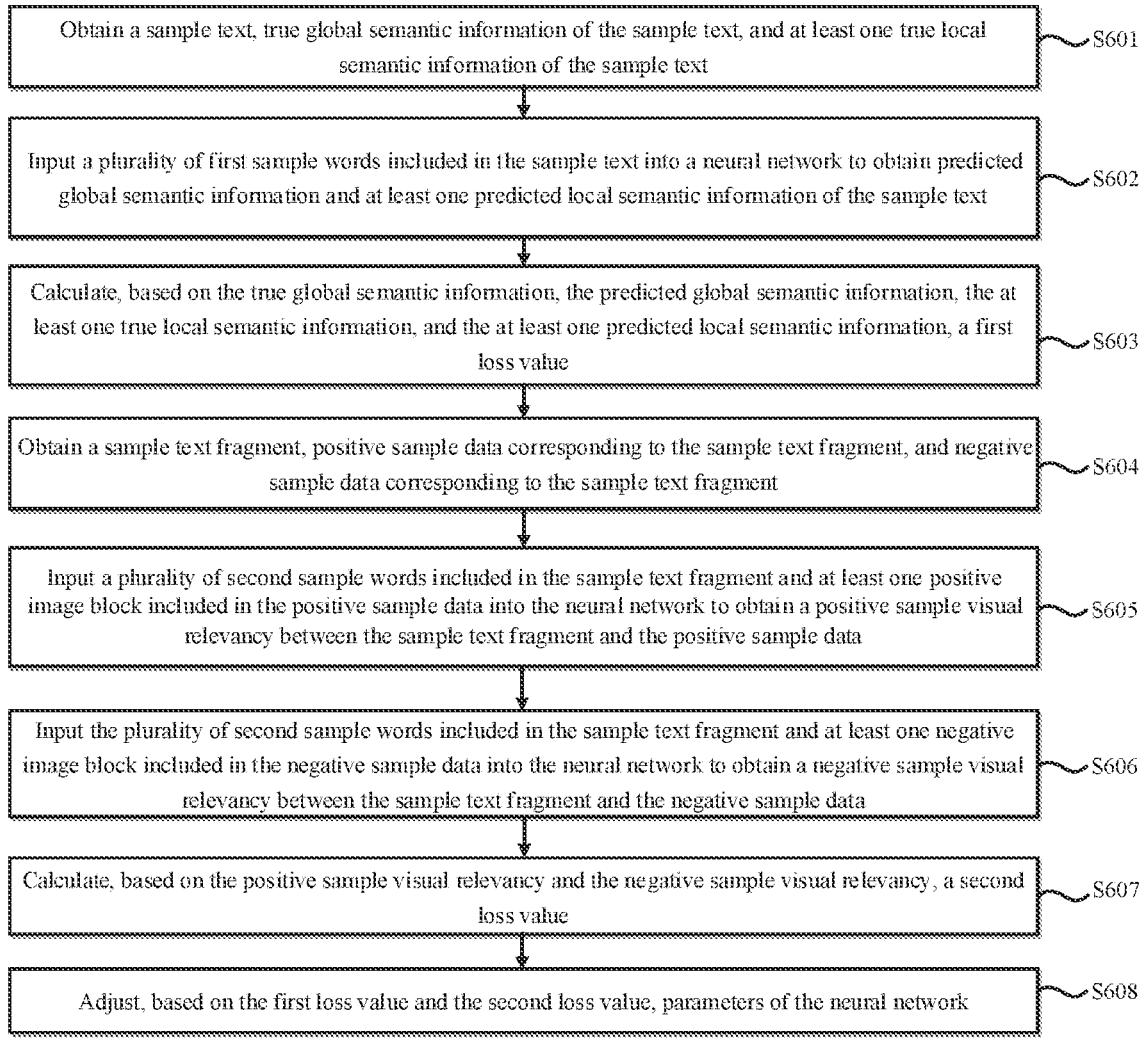
FIG. 6 illustrates a flowchart of a method for training a neural network according to an example embodiment of the present disclosure.

According to another aspect of the present disclosure, a method for training a neural network is provided. The neural network is configured to embed a plurality of received inputs to obtain a plurality of corresponding input features, and process the plurality of input features by using a self-attention mechanism. As shown in FIG. 6, the training method includes: step S601, a sample text, ground truth global semantic information of the sample text, and at least one ground truth local semantic information of the sample text are obtained, where the at least one ground truth local semantic information corresponds to at least one text fragment in the sample text: step S602, a plurality of first sample words included in the sample text are input into the neural network to obtain predicted global semantic information and at least one predicted local semantic information of the sample text: step S603, a first loss value is calculated based on the ground truth global semantic information, the predicted global semantic information, the at least one ground truth local semantic information and the at least one predicted local semantic information: step S604, a sample text fragment, positive sample data corresponding to the sample text fragment, and negative sample data corresponding to the sample text fragment are obtained; step S605, a plurality of second sample words included in the sample text fragment and at least one positive image patch included in the positive sample data are input into the neural network to obtain a positive sample visual relevancy between the sample text fragment and the positive sample data, where the positive sample visual relevancy indicates a relevancy between text information of the sample text fragment and visual information of the positive sample data: step S606, the plurality of second sample words and at least one negative image patch included in the negative sample data are input into the neural network to obtain a negative sample visual relevancy between the sample text fragment and the negative sample data, where the negative sample visual relevancy indicates a relevancy between the text information of the sample text fragment and visual information of the negative sample data: step S607, a second loss value is calculated based on the positive sample visual relevancy and the negative sample visual relevancy, where the second loss value is negatively relevant to the positive sample visual relevancy, and is positively relevant to the negative sample visual relevancy; and step S608, parameters of the neural network are adjusted based on the first loss value and the second loss value.

Therefore, by using the sample text, the ground truth global semantic information, and the local semantic information for training, the unified modal neural network can have the capacity to extract global and local semantic information, and by using the sample text fragment, the corresponding positive sample data and the corresponding negative sample data for training, the unified modal neural network can have the capacity to calculate the visual relevancy between the text information of the text or text fragment and the visual information of the image or video data. Through the two types of training on the unified modal neural network, text features and visual features in the two tasks, namely global and local semantic information extraction and visual relevancy calculation, are located in the same semantic space, thus establishing a relevancy relationship between the two tasks. Therefore, the global semantic information and local semantic information output by the neural network in use are more suitable for an application scenario, the accuracy of a relevancy calculation result is improved, and thus generated video and text content are highly consistent.

According to some embodiments, the unified modal neural network may be first subject to self-supervised pre-training by using unlabeled large-scale text and visual data. For example, mask self-supervised learning is used for text data, image reconstruction self-supervised learning is used for image data and cross-modal contrastive learning is used for graphic data, so as to make full use of unlabeled data to make the unified modal neural network have the capacity to express features. The text mask self-supervised learning may be performed by masking input text randomly, predicting masked words based on output corresponding to the masked position, and then performing training based on ground truth labels and prediction results. The image reconstruction self-supervised learning may cover part of an image in a similar way, reconstruct an image based on output image features, and then perform training based on the original image and the reconstructed image. The cross-modal contrastive learning may be performed by inputting text data and image data into the neural network at the same time, and performing training based on a prediction result of whether image and text match and a ground truth relevancy between the image and text output by the neural network.

According to some embodiments, the ground truth global semantic information and the ground truth local semantic information of the sample text may be, for example, user-generated. In one embodiment, the two semantic information may be content generated after a user manually modifies the predicted global semantic information and the predicted local semantic information generated by the neural network.

According to some embodiments, the positive sample data and the negative sample data are both video data or image data. In some embodiments, the positive sample data corresponding to the sample text fragment may be, for example, an image or video manually selected by the user, and the corresponding negative sample data may be, for example, data selected randomly from other data.

Therefore, by using the data fed back by the user for weakly supervised training, the accuracy of results output by the neural network can be further improved, and the results output by the neural network can be more in line with the preference of the user for candidate data selection.

Figure 7:
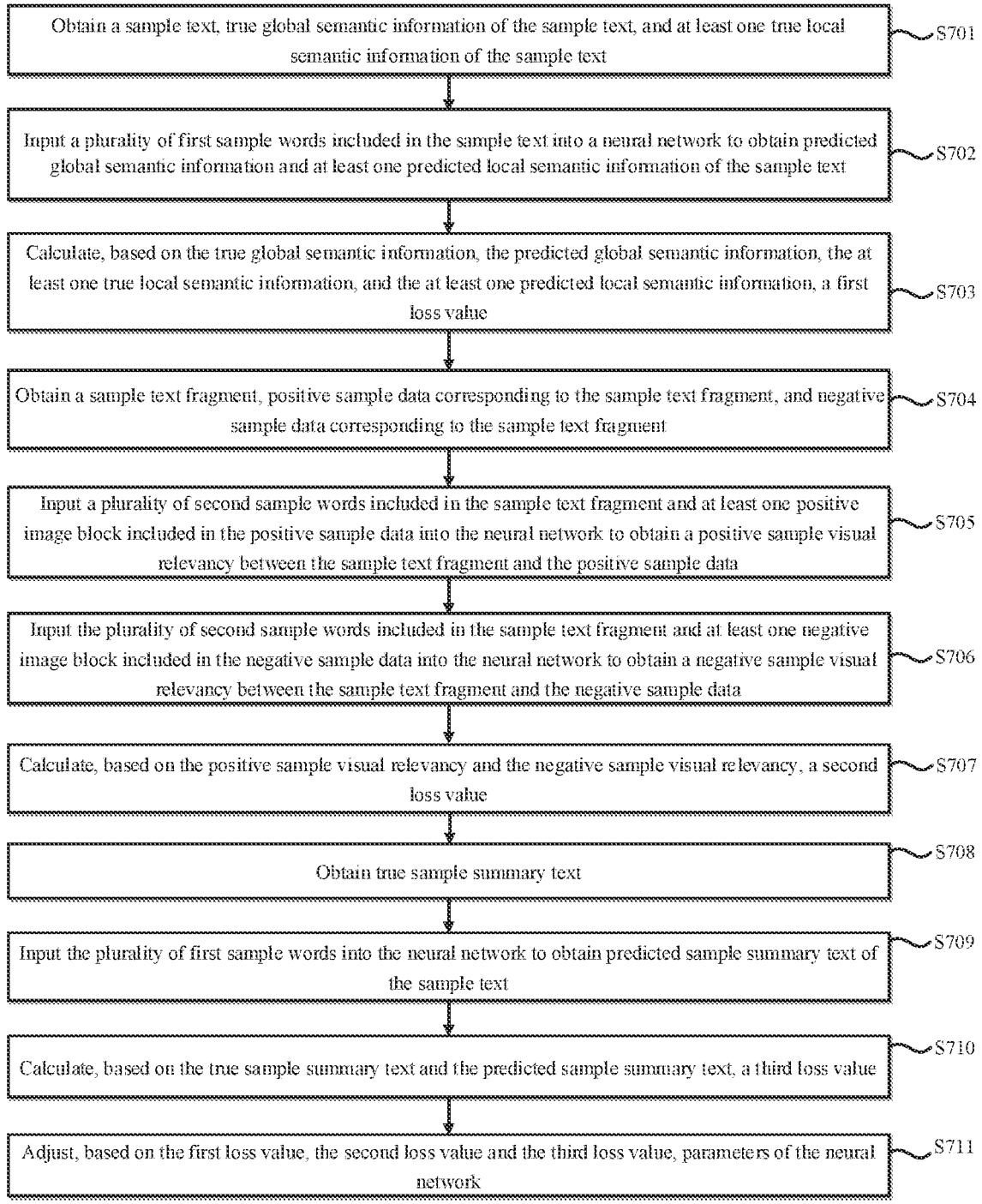
FIG. 7 illustrates a flowchart of a method for training a neural network according to an example embodiment of the present disclosure.

According to some embodiments, as shown in FIG. 7, a method for training a neural network may further include: step S708, a ground truth sample summary text is obtained: step S709, the plurality of first sample words are input into the neural network to obtain a predicted sample summary text of the sample text, and step S710, a third loss value is calculated based on the ground truth sample summary text and the predicted sample summary text Step S711, the parameters of the neural network are adjusted based on the first loss value, the second loss value and the third loss value. The operations and effects of steps S701 to S707 in FIG. 7 are similar to the operations and effects of steps S601 to S607 in FIG. 6 respectively, which will not be repeated here.

Therefore, by using the sample text and the ground truth sample summary text for training, the unified modal neural network can have the capacity of summary extraction.

According to some embodiments, the ground truth sample summary text may be determined based on user input. Therefore, by further training the unified modal neural network with data input or selected by a user, feedback learning can be achieved, and it is ensured that a video generation effect can be continuously upgraded and optimized.

Figure 8:
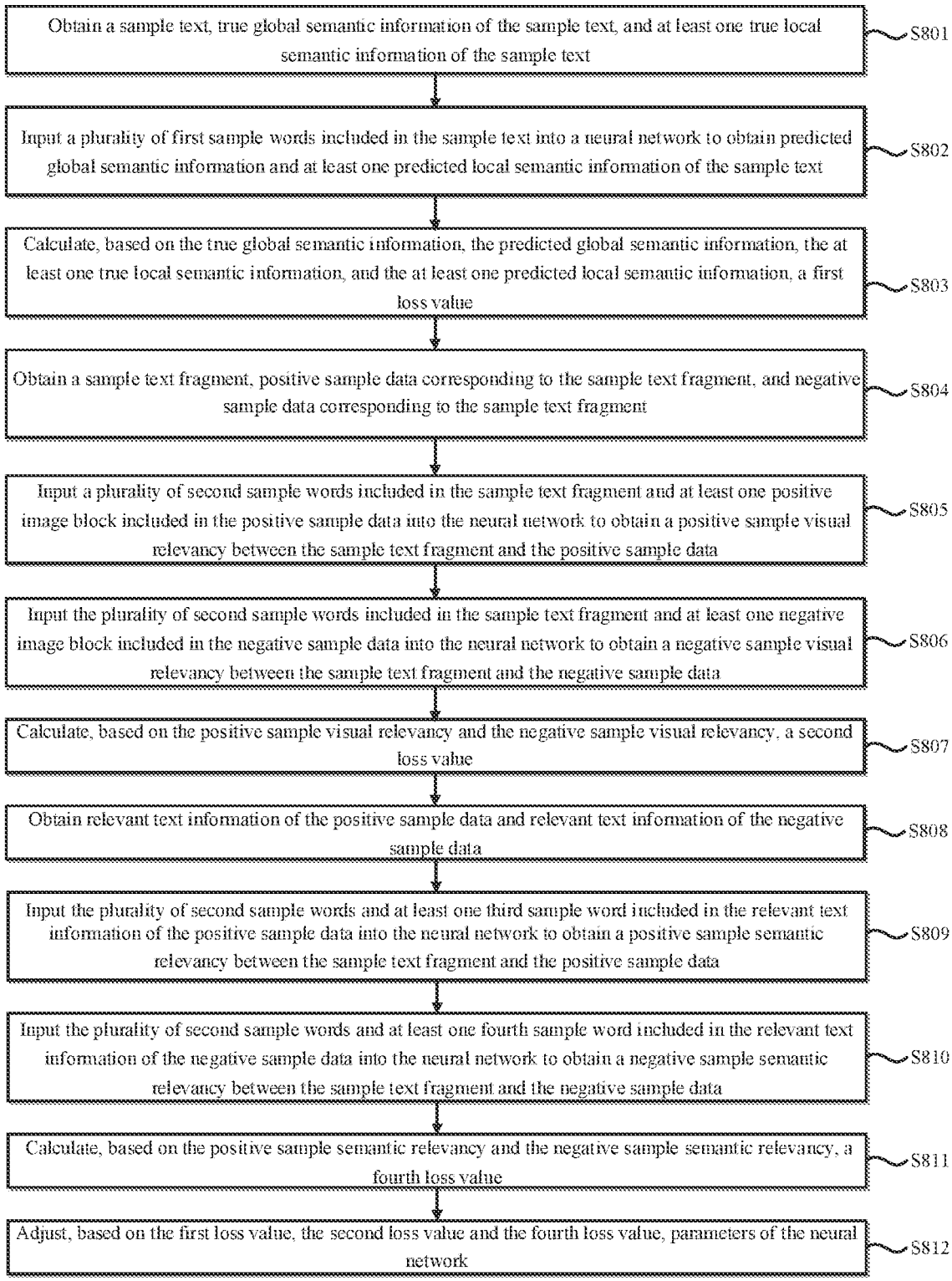
FIG. 8 illustrates a flowchart of a method for training a neural network according to an example embodiment of the present disclosure.

According to some embodiments, as shown in FIG. 8, a method for training a neural network may further include: step S808, relevant text information of the positive sample data and relevant text information of the negative sample data are obtained, where the relevant text information includes at least one of content semantic information, description text information, and speech text information of the corresponding sample data: step S809, the plurality of second sample words and at least one third sample word included in the relevant text information of the positive sample data are input into the neural network to obtain a positive sample semantic relevancy between the sample text fragment and the positive sample data, where the positive sample semantic relevancy indicates a relevancy between the text information of the sample text fragment and the relevant text information of the positive sample data: step S810, the plurality of second sample words and at least one fourth sample word included in the relevant text information of the negative sample data are input into the neural network to obtain a negative sample semantic relevancy between the sample text fragment and the negative sample data, where the negative sample semantic relevancy indicates a relevancy between the text information of the sample text fragment and the relevant text information of the negative sample data; and step S811, a fourth loss value is calculated based on the positive sample semantic relevancy and the negative sample semantic relevancy, where the fourth loss value is negatively relevant to the positive sample semantic relevancy, and is positively relevant to the negative sample semantic relevancy. Step S812, the parameters of the neural network are adjusted based on the first loss value, the second loss value and the fourth loss value. The operations and effects of steps S801 to S807 in FIG. 8 are similar to the operations and effects of steps S601 to S607 in FIG. 6 respectively, which will not be repeated here.

Therefore, by training the neural network with the relevant text information of the positive sample data and the negative sample data and the text information of the text fragment, the neural network can output the relevancy between the relevant text information of the data and the text information of the text fragment, which can provide richer relevancy information when matching candidate data with text fragments.

Figure 9:
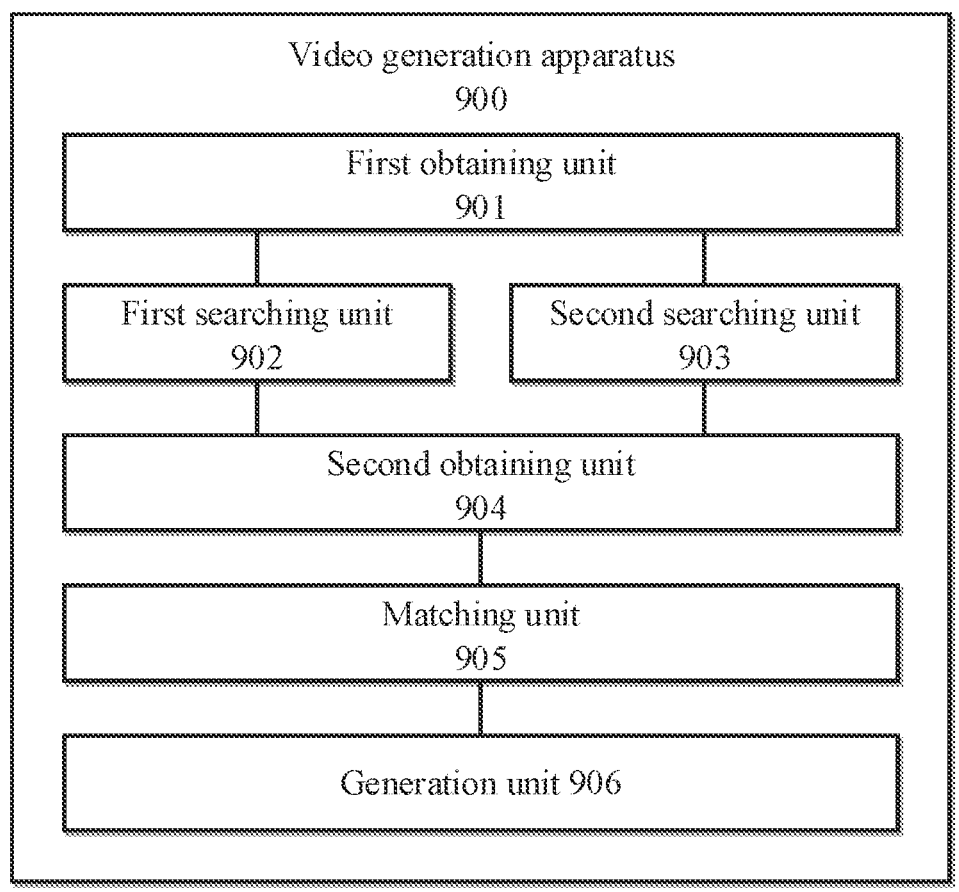
FIG. 9 illustrates a structural block diagram of a video generation apparatus according to an example embodiment of the present disclosure.

According to yet another aspect of the present disclosure, as shown in FIG. 9, a video generation apparatus 900 is provided, and includes: a first obtaining unit 901, configured to obtain global semantic information and at least one local semantic information of text, where the at least one local semantic information corresponds to at least one text fragment in the text: a first searching unit 902, configured to search, based on the global semantic information, a database to obtain at least one first data corresponding to the global semantic information: a second searching unit 903, configured to search, based on each local semantic information in the at least one local semantic information, the database to obtain at least one second data corresponding to the local semantic information: a second obtaining unit 904, configured to obtain, based on the at least one first data and the at least one second data corresponding to each of the at least one local semantic information, a candidate data set: a matching unit 905, configured to match, based on a relevancy between each of the at least one text fragment and corresponding candidate data in the candidate data set, target data for the at least one text fragment; and a generation unit 906, configured to generate, based on the target data matched with each of the at least one text fragment, a video. It can be understood that the operations and effects of the units 901 to 906 in the video generation apparatus 900 are similar to the operations and effects of steps S201 to S206 in FIG. 2 respectively, which will not be repeated here.

Figure 10:
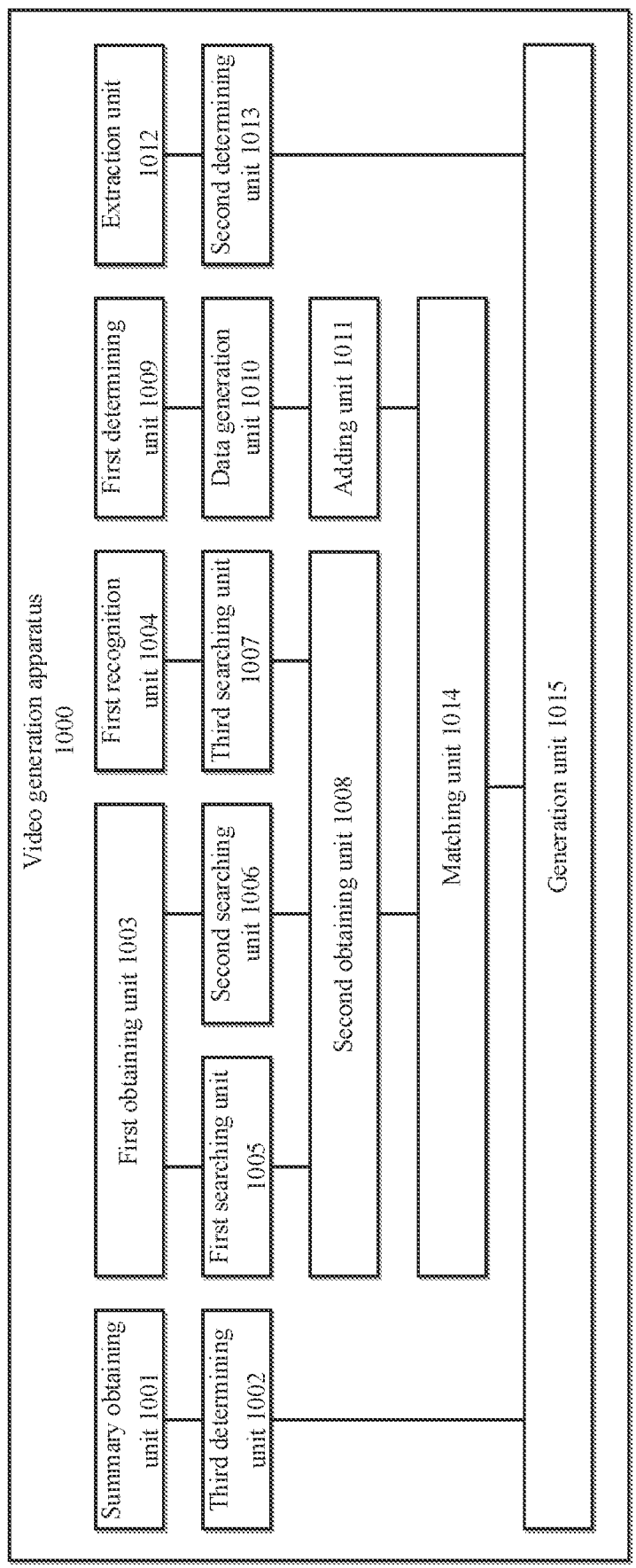
FIG. 10 illustrates a structural block diagram of a video generation apparatus according to an example embodiment of the present disclosure.

According to some embodiments, as shown in FIG. 10, a video generation apparatus 1000 may further include: a summary obtaining unit 1001, configured to obtain a summary text of the text; and a third determining unit 1002, configured to determine, based on the summary text, at least one of video subtitles, video speech, and video background music. It can be understood that the operations and effects of units 1003, 1005, 1006, 1008, 1014 and 1015 in the video generation apparatus 1000 are similar to the operations and effects of the units 901 to 906 in the video generation apparatus 900 respectively, which will not be repeated here.

According to some embodiments, the global semantic information and the at least one local semantic information may be obtained by using a trained unified modal neural network.

According to some embodiments, as shown in FIG. 10, the video generation apparatus 1000 may further include: a first recognition unit 1004, configured to recognize at least one entity word in the at least one text fragment.

According to some embodiments, the first searching unit 1005 may include: a third search subunit, configured to search, based on the global semantic information and a title of the text, the database to obtain the at least one first data.

According to some embodiments, the second searching unit 1006 may include: a second search subunit, configured to search, based on each local semantic information in the at least one local semantic information and a text fragment corresponding to the local semantic information, the database to obtain the at least one second data.

According to some embodiments, searching, based on each local semantic information in the at least one local semantic information and the text fragment corresponding to the local semantic information, the database to obtain the at least one second data may include: the database is searched based on each local semantic information in the at least one local semantic information to obtain a plurality of second search results; and the plurality of second search results are filtered based on at least one of the text fragment corresponding to the local semantic information and the text to obtain the at least one second data.

According to some embodiments, as shown in FIG. 10, the video generation apparatus 1000 may further include: a third searching unit 1007, configured to search, based on each entity word in the at least one entity word, the database to obtain at least one third data corresponding to the entity word. The second obtaining unit 1008 may be further configured to obtain, based on the at least one first data, the at least one second data corresponding to each of least one local semantic information, and the at least one third data corresponding to each of the at least one entity word, the candidate data set.

According to some embodiments, the second searching unit 1007 may include: a first search subunit, configured to search, based on each entity word in the at least one entity word and a text fragment where the entity word is located, the database to obtain the at least one third data.

According to some embodiments, searching, based on each entity word in the at least one entity word and the text fragment where the entity word is located, the database to obtain the at least one third data corresponding to the entity word may include: the database is searched based on each entity word in the at least one entity word to obtain a plurality of third search results; and the plurality of third search results are filtered based on at least one of the text fragment where the entity word is located and the text to obtain the at least one third data.

Figure 11:
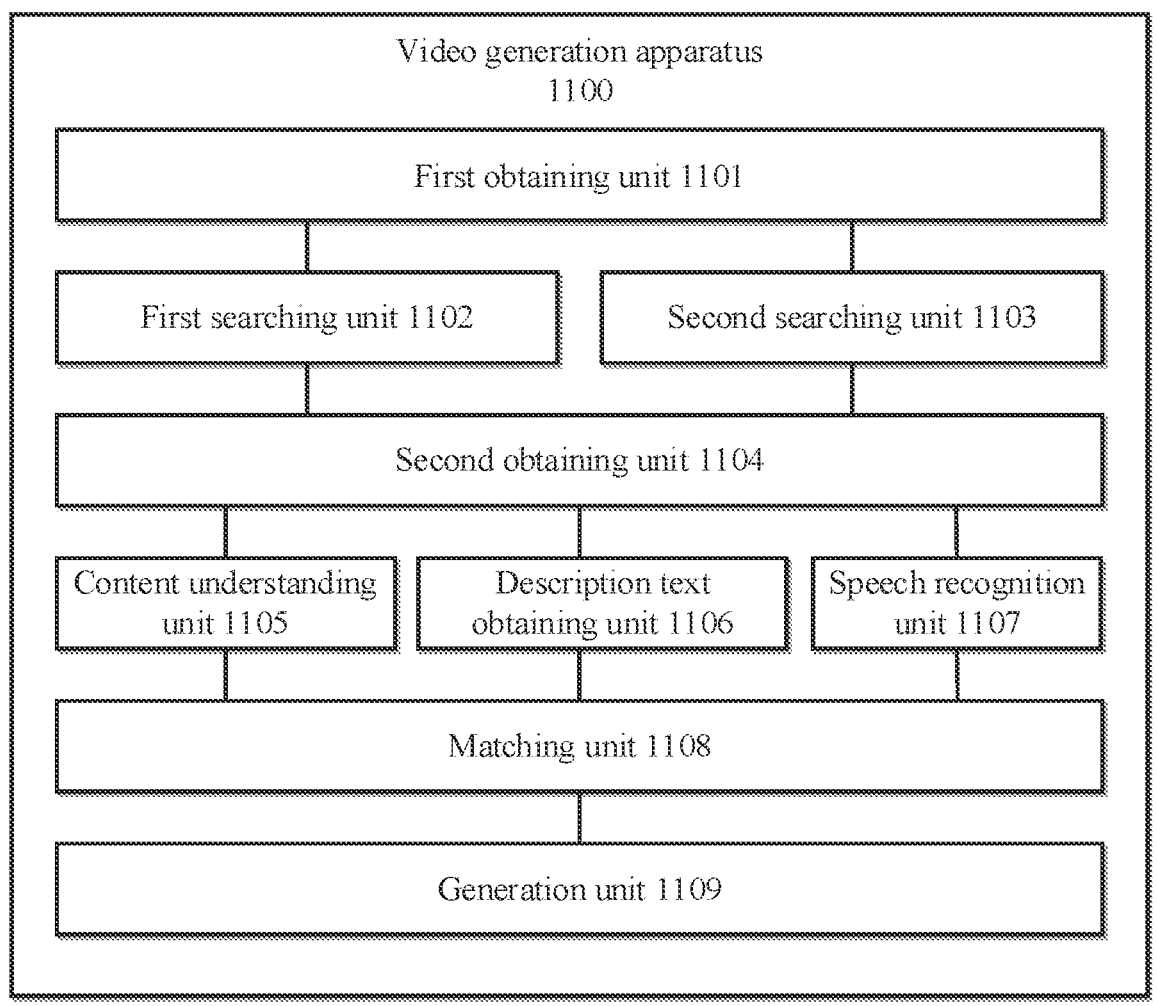
FIG. 11 illustrates a structural block diagram of a video generation apparatus according to an example embodiment of the present disclosure.

According to some embodiments, as shown in FIG. 11, a video generation apparatus 1100 may further include: a content understanding unit 1105, configured to perform content understanding on each candidate data in the candidate data set to obtain content semantic information of the candidate data: a description text obtaining unit 1106, configured to obtain description text information of each candidate data in the candidate data set; and a speech recognition unit 1107, configured to perform speech recognition on audio data of each candidate data in the candidate data set to obtain speech text information corresponding to the candidate data. It can be understood that the operations and effects of units 1101 to 1104, 1108 and 1109 in the video generation apparatus 1100 are similar to the operations and effects of the units 901 to 906 in the video generation apparatus 900 respectively, which will not be repeated here.

According to some embodiments, the content understanding includes at least one of text recognition and entity recognition.

Back to FIG. 10. According to some embodiments, the second obtaining unit 1008 may include: a third obtaining subunit, configured to filter, based on a first target filtering rule, the at least one first data and the at least one second data corresponding to each of the at least one local semantic information to obtain a plurality of data to be segmented: a segmenting subunit, configured to segment, based on a target fragmentation rule, each of the plurality of data to be segmented to obtain a plurality of data fragments; and a filtering subunit, configured to filter, based on a second target filtering rule, the plurality of data fragments to obtain the candidate data set.

According to some embodiments, as shown in FIG. 10, the video generation apparatus 1000 may further include: a first determining unit 1009, configured to determine a target text fragment for directly generating video data or image data in the at least one text fragment: a data generation unit 1010, configured to generate fifth data directly based on the target text fragment by using the unified modal neural network; and an adding unit 1011, configured to add the fifth data to the candidate data set.

According to some embodiments, the data generation unit may include: a recognition subunit, configured to recognize entity words in the target text fragment; and a data generation subunit, configured to generate the fifth data directly based on the entity words by using the unified modal neural network.

According to some embodiments, as shown in FIG. 10, the video generation apparatus 1000 may further include: an extraction unit 1012, configured to extract, from an original page, the text and one or more of fourth data corresponding to the text, where the one or more of fourth data correspond to one or more text fragments, different from the at least one text fragment, in the text, and a second determining unit 1013, configured to determine each of the one or more of fourth data as target data for the text fragments corresponding to the fourth data.

According to some embodiments, the relevancy may include a visual relevancy between the text information of each text fragment and visual information of the corresponding candidate data. The visual relevancy may be determined based on the input text fragment and the input candidate data by using the unified modal neural network.

According to some embodiments, the matching unit 1014 may include: a determining subunit, configured to determine, by using the unified modal neural network, a first number of candidate data, having the highest visual relevancy with each text fragment in the at least one text fragment, in the candidate data set; and a matching subunit, configured to match, based on a relevancy between each of the at least one text fragment and the corresponding candidate data in the first number of candidate data, the target data for the at least one text fragment.

According to some embodiments, the visual relevancy may be determined based on the input text fragment, the local semantic information corresponding to the input text fragment, and the input candidate data by using the unified modal neural network.

According to some embodiments, a visual relevancy between a text fragment, including one or more entity words, in the at least one text fragment and corresponding candidate data may be determined based on the text fragment, the one or more entity words, the local semantic information corresponding to the text fragment, and the corresponding candidate data by using the unified modal neural network.

According to some embodiments, each candidate data in the candidate data set is matched with at most one of the at least one text fragment. The determining subunit may be further configured to determine, in response to determining that a part of the at least one text fragment fail to be matched with target data, a second number of candidate data, having the highest relevancy with each text fragment of the part of text fragments, in unmatched candidate data of the candidate data set by using the unified modal neural network. The matching subunit may be further configured to match, based on the relevancy between each of the part of text fragments and the corresponding candidate data in the second number of candidate data, target data for the part of text fragments.

According to some embodiments, the generation unit 1015 may include: a generation subunit, configured to generate, based on at least one of the video subtitles, video speech, and video background music, and the target data matched with each of the at least one text fragment, the video.

According to some embodiments, the generation unit may be further configured to generate, based on the target data matched with each of the at least one text fragment and the target data matched with each of the one or more text fragments, the video.

According to some embodiments, the relevancy may further include a first semantic relevancy between the text information of each text fragment and the content semantic information of the corresponding candidate data, and the first semantic relevancy is determined based on the input text fragment and the input content semantic information by using the unified modal neural network.

According to some embodiments, the relevancy may further include a second semantic relevancy between the text information of each text fragment and the description text information of the corresponding candidate data. The second semantic relevancy is determined based on the input text fragment and the input description text information by using the unified modal neural network.

According to some embodiments, the relevancy may further include a third semantic relevancy between the text information of each text fragment and the speech text information of the corresponding candidate data, and the third semantic relevancy is determined based on the input text fragment and the input speech text information by using the unified modal neural network.

Figure 12:
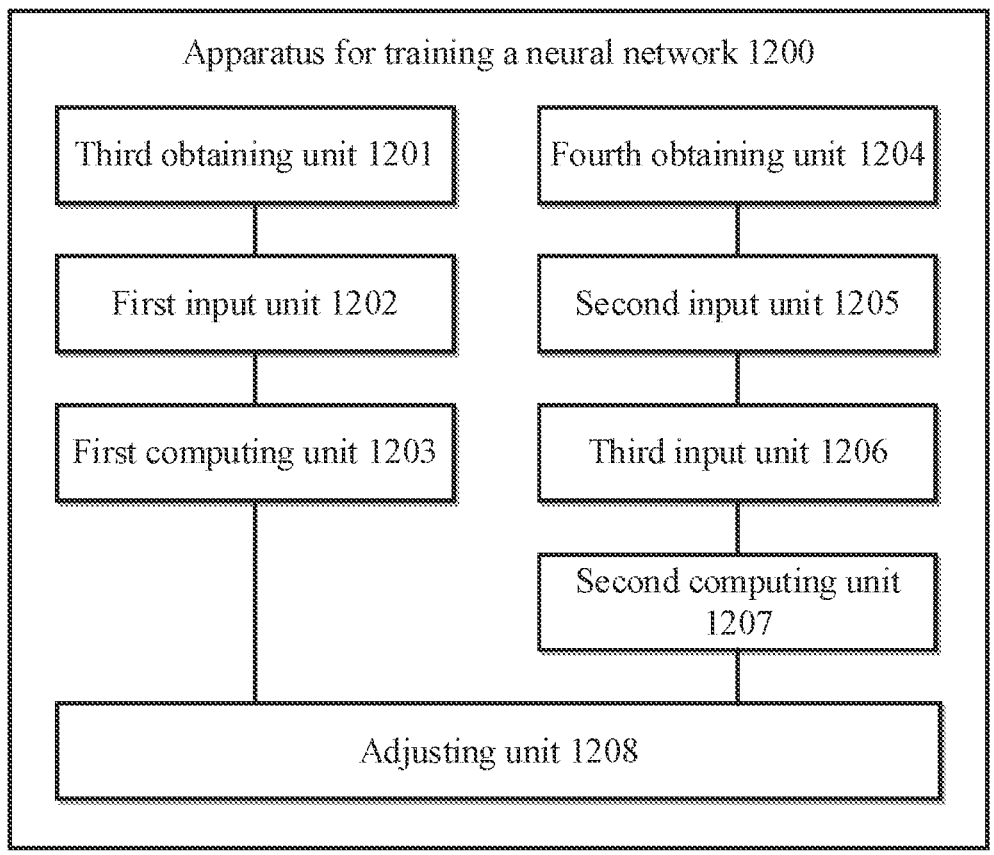
FIG. 12 illustrates a structural block diagram of an apparatus for training a neural network according to an example embodiment of the present disclosure.

According to another aspect of the present disclosure, as shown in FIG. 12, an apparatus 1200 for training a neural network is further provided. The neural network is configured to embed a plurality of received inputs to obtain a plurality of corresponding input features, and process the plurality of input features by using a self-attention mechanism. The apparatus includes: a third obtaining unit 1201, configured to obtain a sample text, ground truth global semantic information of the sample text, and at least one ground truth local semantic information of the sample text, where the at least one ground truth local semantic information corresponds to at least one text fragment in the sample text: a first input unit 1202, configured to input a plurality of first sample words included in the sample text into the neural network to obtain predicted global semantic information and at least one predicted local semantic information of the sample text: a first calculating unit 1203, configured to calculate, based on the ground truth global semantic information, the predicted global semantic information, the at least one ground truth local semantic information and the at least one predicted local semantic information, a first loss value: a fourth obtaining unit 1204, configured to obtain a sample text fragment, positive sample data corresponding to the sample text fragment, and negative sample data corresponding to the sample text fragment: a second input unit 1205, configured to input a plurality of second sample words included in the sample text fragment and at least one positive image patch included in the positive sample data into the neural network to obtain a positive sample visual relevancy between the sample text fragment and the positive sample data, where the positive sample visual relevancy indicates a relevancy between text information of the sample text fragment and visual information of the positive sample data: a third input unit 1206, configured to input the plurality of second sample words and at least one negative image patch included in the negative sample data into the neural network to obtain a negative sample visual relevancy between the sample text fragment and the negative sample data, where the negative sample visual relevancy indicates a relevancy between the text information of the sample text fragment and visual information of the negative sample data: a second calculating unit 1207, configured to calculate, based on the positive sample visual relevancy and the negative sample visual relevancy, a second loss value, where the second loss value is negatively relevant to the positive sample visual relevancy, and is positively relevant to the negative sample visual relevancy; and an adjusting unit 1208, configured to adjust, based on the first loss value and the second loss value, parameters of the neural network. It can be understood that the operations and effects of the units 1201 to 1208 in the training apparatus 1200 are similar to the operations and effects of the steps 601 to 608 in FIG. 6 respectively, which will not be repeated here.

Figure 13:
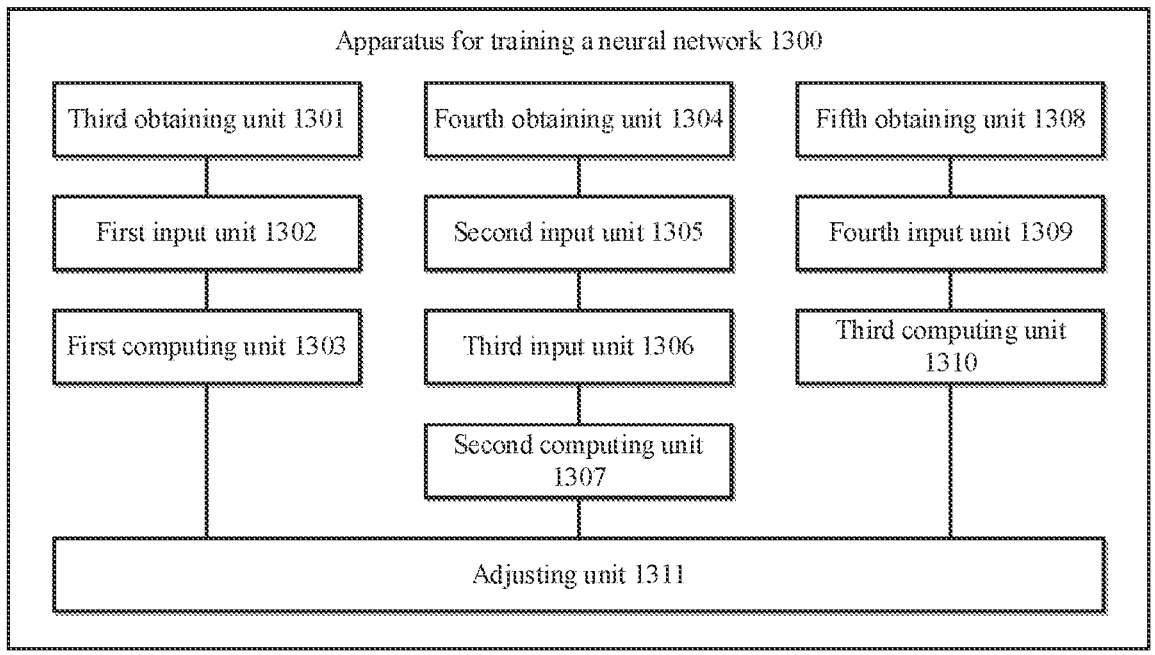
FIG. 13 illustrates a structural block diagram of an apparatus for training a neural network according to an example embodiment of the present disclosure.

According to some embodiments, as shown in FIG. 13, an apparatus 1300 for training the neural network may further include: a fifth obtaining unit 1308, configured to obtain a ground truth sample summary text: a fourth input unit 1309, configured to input the plurality of first sample words into the neural network to obtain a predicted sample summary text of the sample text; and a third computing unit 1310, configured to calculate, based on the ground truth sample summary text and the predicted sample summary text, a third loss value. An adjusting unit 1311 is further configured to adjust, based on the first loss value, the second loss value and the third loss value, the parameters of the neural network. It can be understood that the operations and effects of units 1301 to 1307 in the training apparatus 1300 are similar to the operations and effects of the units 1201 to 1207 in the training apparatus 1200 respectively, which will not be repeated here.

According to some embodiments, the ground truth sample summary text may be determined based on user input. Therefore, by further training the unified modal neural network with data input or selected by a user, feedback learning can be achieved, and it is ensured that a video generation effect can be continuously upgraded and optimized.

Figure 14:
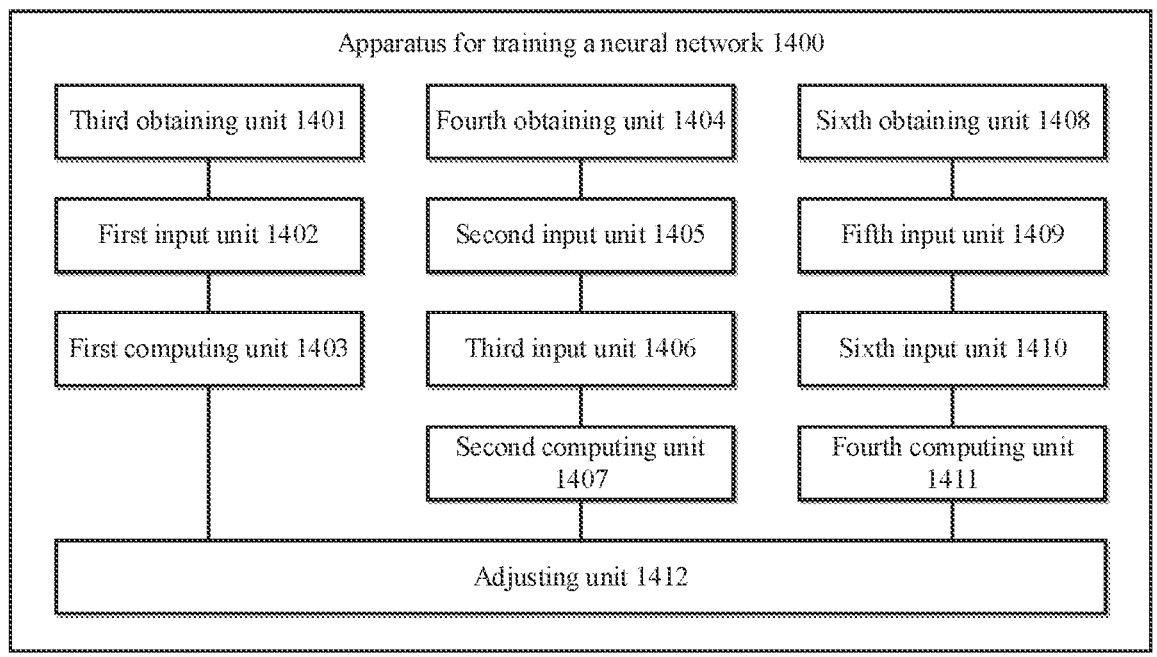
FIG. 14 illustrates a structural block diagram of an apparatus for training a neural network according to an example embodiment of the present disclosure.

According to some embodiments, as shown in FIG. 14, an apparatus 1400 for training the neural network may further include, a sixth obtaining unit 1408, configured to obtain relevant text information of the positive sample data and relevant text information of the negative sample data, where the relevant text information includes at least one of content semantic information, description text information, and speech text information of the corresponding sample data: a fifth input unit 1409, configured to input the plurality of second sample words and at least one third sample word included in the relevant text information of the positive sample data into the neural network to obtain a positive sample semantic relevancy between the sample text fragment and the positive sample data, where the positive sample semantic relevancy indicates a relevancy between the text information of the sample text fragment and the relevant text information of the positive sample data: a sixth input unit 1410, configured to input the plurality of second sample words and at least one fourth sample word included in the relevant text information of the negative sample data into the neural network to obtain a negative sample semantic relevancy between the sample text fragment and the negative sample data, where the negative sample semantic relevancy indicates a relevancy between the text information of the sample text fragment and the relevant text information of the negative sample data; and a fourth calculation unit 1411, configured to calculate, based on the positive sample semantic relevancy and the negative sample semantic relevancy, a fourth loss value, where the fourth loss value is negatively relevant to the positive sample semantic relevancy, and is positively relevant to the negative sample semantic relevancy. An adjusting unit 1412 is further configured to adjust, based on the first loss value, the second loss value and the fourth loss value, the parameters of the neural network. It can be understood that the operations and effects of the units 1401 to 1407 in the training apparatus 1400 are similar to the operations and effects of the units 1201 to 1207 in the training apparatus 1200 respectively, which will not be repeated here.

In the technical solutions of the present disclosure, the collection, storage, use, processing, transmission, provision, and disclosure of involved personal information of the user are all in compliance with relevant laws and regulations, and do not violate public order and good customs.

According to an embodiment of the present disclosure, an electronic device, a readable storage medium and a computer program product are further provided.

Figure 15:
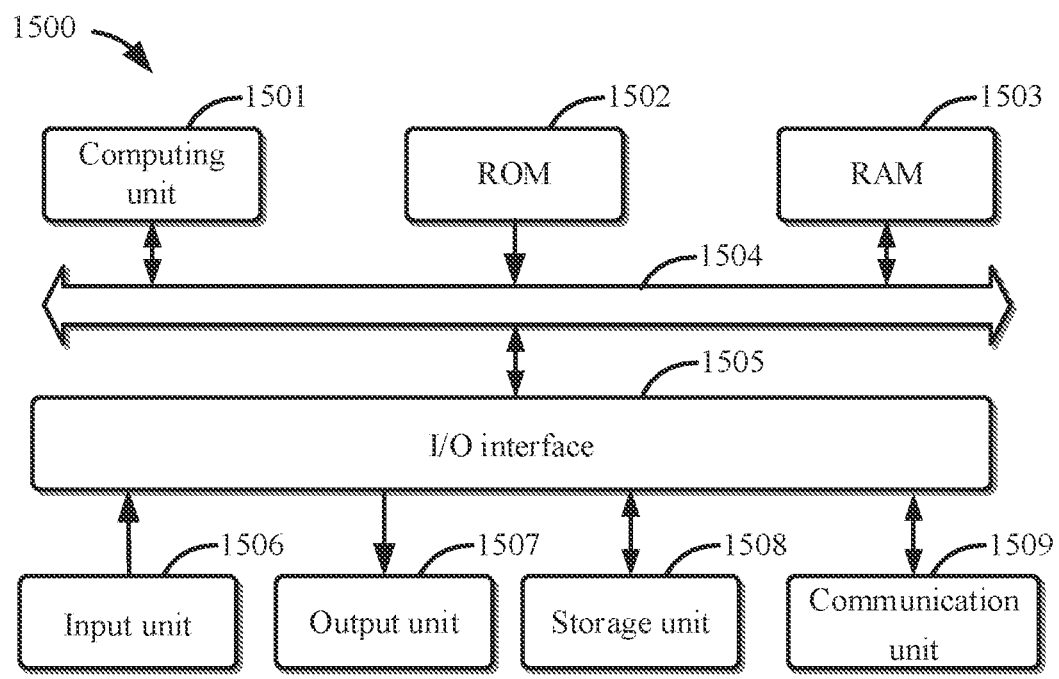
FIG. 15 illustrates a structural block diagram of an example electronic device that can be configured to implement embodiments of the present disclosure.

Referring to FIG. 15, a structural block diagram of an electronic device 1500 that may serve as a server or a client of the present disclosure will now be described, and the electronic device is an example of a hardware device that may be applied to various aspects of the present disclosure. The electronic device is intended to represent various forms of digital electronic computer devices, such as a laptop computer, a desktop computer, a workstation, a personal digital assistant, a server, a blade server, a mainframe computer, and other suitable computers. The electronic device may further represent various forms of mobile apparatuses, such as a personal digital assistant, a cell phone, a smart phone, a wearable device and other similar computing apparatuses. The components shown herein, their connections and relationships, and their functions are merely used as examples, and are not intended to limit the implementations of the present disclosure described and/or required here.

As shown in FIG. 15, the device 1500 includes a computing unit 1501 that may perform various appropriate actions and processing according to computer programs stored in a read-only memory (ROM) 1502 or computer programs loaded from a storage unit 1508 into a random access memory (RAM) 1503. Various programs and data required for operations of the device 1500 may further be stored in the RAM 1503. The computing unit 1501, the ROM 1502 and the RAM 1503 are connected to one another via a bus 1504. An input/output (I/O) interface 1505 is also connected to the bus 1504.

A plurality of components in the device 1500 are connected to the I/O interface 1505, including: an input unit 1506, an output unit 1507, a storage unit 1508, and a communication unit 1509. The input unit 1506 may be any type of device capable of inputting information to the device 1500. The input unit 1506 may receive input digital or character information and generate key signal input related to user settings and/or function control of the electronic device, and may include, but not limited to, a mouse, a keyboard, a touch screen, a trackpad, a trackball, a joystick, a microphone and/or a remote control. The output unit 1507 may be any type of device capable of presenting information, and may include, but not limited to, a display, a speaker, a video/audio output terminal, a vibrator and/or a printer. The storage unit 1508 may include, but not limited to, a magnetic disk and a compact disk. The communication unit 1509 allows the device 1500 to exchange information/data with other devices via computer networks such as the Internet and/or various telecommunication networks, and may include but not limited to a modem, a network card, an infrared communication device, a wireless communication transceiver and/or a chipset, such as a Bluetooth™ device, an 802.11 device, a WiFi device, a WiMax device, a cellular communication device and/or the like.

The computing unit 1501 may be various general-purpose and/or special-purpose processing components with processing and computing capabilities. Some examples of the computing unit 1501 include, but not limited to, a central processing unit (CPU), a graphics processing unit (GPU), various dedicated artificial intelligence (AI) computing chips, various computing units running machine learning network algorithms, a digital signal processor (DSP), and any appropriate processor, controller, microcontroller, etc. The computing unit 1501 performs various methods and processing described above, such as the video generation method and the method for training the neural network. For example, in some embodiments, the video generation method and the method for training the neural network may be implemented as a computer software program that is tangibly included in a machine-readable medium, such as the storage unit 1508. In some embodiments, part or all of the computer programs may be loaded and/or installed onto the device 1500 via the ROM 1502 and/or the communication unit 1509. When the computer programs are loaded into the RAM 1503 and executed by the computing unit 1501, one or more steps of the video generation method and the method for training the neural network described above may be performed. Alternatively, in other embodiments, the computing unit 1501 may be configured to perform the video generation method and the method for training the neural network in any other suitable manner (for example, by means of firmware).

Various implementations of the systems and technologies described above in this paper may be implemented in a digital electronic circuit system, an integrated circuit system, a field programmable gate array (FPGA), an application specific integrated circuit (ASIC), an application specific standard part (ASSP), a system on chip (SOC), a complex programmable logic device (CPLD), computer hardware, firmware, software and/or their combinations. These various implementations may include: being implemented in one or more computer programs, wherein the one or more computer programs may be executed and/or interpreted on a programmable system including at least one programmable processor, and the programmable processor may be a special-purpose or general-purpose programmable processor, and may receive data and instructions from a storage system, at least one input apparatus, and at least one output apparatus, and transmit the data and the instructions to the storage system, the at least one input apparatus, and the at least one output apparatus.

Program codes for implementing the methods of the present disclosure may be written in any combination of one or more programming languages. These program codes may be provided to processors or controllers of a general-purpose computer, a special-purpose computer or other programmable data processing apparatuses, so that when executed by the processors or controllers, the program codes enable the functions/operations specified in the flow diagrams and/or block diagrams to be implemented. The program codes may be executed completely on a machine, partially on the machine, partially on the machine and partially on a remote machine as a separate software package, or completely on the remote machine or server.

In the context of the present disclosure, a machine readable medium may be a tangible medium that may contain or store a program for use by or in connection with an instruction execution system, apparatus or device. The machine readable medium may be a machine readable signal medium or a machine readable storage medium. The machine readable medium may include but not limited to an electronic, magnetic, optical, electromagnetic, infrared, or semiconductor system, apparatus or device, or any suitable combination of the above contents. More specific examples of the machine readable storage medium will include electrical connections based on one or more lines, a portable computer disk, a hard disk, a random access memory (RAM), a read only memory (ROM), an erasable programmable read only memory (EPROM or flash memory), an optical fiber, a portable compact disk read only memory (CD-ROM), an optical storage device, a magnetic storage device, or any suitable combination of the above contents.

In order to provide interactions with users, the systems and techniques described herein may be implemented on a computer, and the computer has: a display apparatus for displaying information to the users (e.g., a CRT (cathode ray tube) or LCD (liquid crystal display) monitor); and a keyboard and a pointing device (e.g., a mouse or trackball), through which the users may provide input to the computer. Other types of apparatuses may further be used to provide interactions with users; for example, feedback provided to the users may be any form of sensory feedback (e.g., visual feedback, auditory feedback, or tactile feedback): an input from the users may be received in any form (including acoustic input, voice input or tactile input).

The systems and techniques described herein may be implemented in a computing system including background components (e.g., as a data server), or a computing system including middleware components (e.g., an application server) or a computing system including front-end components (e.g., a user computer with a graphical user interface or a web browser through which a user may interact with the implementations of the systems and technologies described herein), or a computing system including any combination of such background components, middleware components, or front-end components. The components of the system may be interconnected by digital data communication (e.g., a communication network) in any form or medium. Examples of the communication network include: a local area network (LAN), a wide area network (WAN) and the Internet.

A computer system may include a client and a server. The client and the server are generally far away from each other and usually interact via a communication network. The relationship between the client and the server is generated by computer programs running on the corresponding computer and having a client-server relationship with each other. The server may be a cloud server, also referred to as a cloud computing server or cloud host. The server is a host product in a cloud computing service system to solve the defects of large management difficulty and weak business expansibility of traditional physical host and virtual private server (VPS) services. The server may also be a server of a distributed system, or a server combined with a block chain.

It should be understood that the various forms of processes shown above may be used to reorder, add, or delete steps. For example, the steps recorded in the present disclosure may be performed in parallel, sequentially or in different orders, as long as the desired results of the technical solution disclosed by the present disclosure can be achieved, which is not limited here.

Although the embodiments or examples of the present disclosure have been described with reference to the accompanying drawings, it should be understood that the above methods, systems and devices are only embodiments or examples, and the scope of the present disclosure is not limited by these embodiments or examples, but only by the authorized claims and their equivalent scope. Various elements in the embodiments or examples may be omitted or replaced by their equivalent elements. In addition, the steps may be performed in an order different from that described in the present disclosure. Further, various elements in the embodiments or examples may be combined in various ways. It is important that as technology evolves, many of the elements described herein may be replaced by equivalent elements that appear after the present disclosure.

The invention claimed is:

1. A video generation method, comprising:
   obtaining global semantic information and at least one local semantic information of a text, wherein the at least one local semantic information corresponds to at least one text fragment in the text;
   searching, based on the global semantic information, a database to obtain at least one first data corresponding to the global semantic information;
   searching, based on each local semantic information in the at least one local semantic information, the database to obtain at least one second data corresponding to the local semantic information;
   obtaining, based on the at least one first data and the at least one second data corresponding to each of the at least one local semantic information, a candidate data set;
   matching, based on a relevancy between each text fragment of the at least one text fragment and each candidate data in the candidate data set, target data for the at least one text fragment; and
   generating, based on the target data matched with each of the at least one text fragment, a video, wherein the global semantic information and the at least one local semantic information are obtained by using a trained unified modal neural network, and wherein the relevancy comprises a visual relevancy between text information of a corresponding text fragment and visual information of corresponding candidate data, and the visual relevancy is determined based on the corresponding text fragment and the corresponding candidate data by using the unified modal neural network.

2. The method according to claim 1, further comprising:
   recognizing at least one entity word in the at least one text fragment; and
   for each entity word in the at least one entity word, searching, based on the entity word, the database to obtain at least one third data corresponding to the entity word,
   wherein the obtaining the candidate data set comprises:
   obtaining, based on the at least one first data, the at least one second data corresponding to each local semantic information of the at least one local semantic information, and the at least one third data corresponding to each entity word of the at least one entity word, the candidate data set.

3. The method according to claim 2, wherein the searching the database to obtain the at least one third data corresponding to the entity word comprises:
   for each entity word in the at least one entity word, searching, based on the entity word and a text fragment where the entity word is located, the database to obtain the at least one third data.

4. The method according to claim 3, wherein the searching the database to obtain the at least one third data corresponding to the entity word comprises:
   for each entity word in the at least one entity word, searching, based on the entity word, the database to obtain a plurality of third search results; and
   filtering, based on at least one of the text fragment where the entity word is located and the text, the plurality of third search results to obtain the at least one third data.

5. The method according to claim 4, wherein the searching the database to obtain at least one second data corresponding to the local semantic information comprises:
   for each local semantic information in the at least one local semantic information, searching, based on the local semantic information and a text fragment corresponding to the local semantic information, the database to obtain the at least one second data.

6. The method according to claim 5, wherein the searching the database to obtain the at least one second data comprises:
   for each local semantic information in the at least one local semantic information, searching, based on the local semantic information, the database to obtain a plurality of second search results; and filtering, based on at least one of the text fragment corresponding to the local semantic information and the text, the plurality of second search results to obtain the at least one second data.

7. The method according to claim 5, wherein the searching the database to obtain at least one first data corresponding to the global semantic information comprises:
searching, based on the global semantic information and a title of the text, the database to obtain the at least one first data.

8. The method according to claim 1, further comprising:
performing content understanding on each candidate data in the candidate data set to obtain content semantic information of the candidate data,
wherein the relevancy further comprises a first semantic relevancy between text information of a corresponding text fragment and content semantic information of corresponding candidate data, and the first semantic relevancy is determined based on the corresponding text fragment and the corresponding content semantic information by using the unified modal neural network.

9. The method according to claim 8, wherein the content understanding comprises at least one of text recognition and entity recognition.

10. The method according to claim 1, further comprising:
obtaining description text information of each candidate data in the candidate data set,
wherein the relevancy further comprises a second semantic relevancy between text information of a corresponding text fragment and description text information of corresponding candidate data, and the second semantic relevancy is determined based on the corresponding text fragment and the corresponding description text information by using the unified modal neural network.

11. The method according to claim 1, further comprising:
performing voice recognition on audio data of each candidate data in the candidate data set to obtain voice text information corresponding to the candidate data,
wherein the relevancy further comprises a third semantic relevancy between text information of a corresponding text fragment and voice text information of the corresponding candidate data, and the third semantic relevancy is determined based on the corresponding text fragment and the corresponding voice text information by using the unified modal neural network.

12. The method according to claim 11, wherein the matching the target data for the at least one text fragment comprises:
for each text fragment in the at least one text fragment, determining, by using the unified modal neural network, a first number of candidate data having highest visual relevancies with the text fragment in the candidate data set; and
matching, based on a relevancy between each text fragment of the at least one text fragment and the first number of candidate data corresponding to the text fragment, the target data for the at least one text fragment.

13. The method according to claim 12, wherein each candidate data in the candidate data set is matched with at most one text fragment of the at least one text fragment, and wherein the matching the target data for the at least one text fragment further comprises:
in response to determining that a part of the at least one text fragment fail to be matched with target data, determining, for each text fragment of the part of text fragments and by using the unified modal neural network, a second number of candidate data having highest relevancies with in unmatched candidate data of the candidate data set; and
matching, based on the relevancy between each text fragment of the part of text fragments and each candidate data of the corresponding second number of candidate data, target data for the part of text fragments.

14. The method according to claim 1, wherein the visual relevancy is determined based on the corresponding text fragment, the local semantic information corresponding to the corresponding text fragment, and the corresponding candidate data by using the unified modal neural network.

15. The method according to claim 14, further comprising:
recognizing entity words in the at least one text fragment,
wherein a visual relevancy between a text fragment, comprising one or more entity words, in the at least one text fragment and corresponding candidate data is determined based on the text fragment, the one or more entity words, the local semantic information corresponding to the text fragment, and the corresponding candidate data by using the unified modal neural network.

16. The method according to claim 1, further comprising:
determining a target text fragment for directly generating video data or image data in the at least one text fragment;
generating fifth data directly based on the target text fragment by using the unified modal neural network, wherein visual content of the fifth data is relevant to the target text fragment; and
adding the fifth data to the candidate data set.

17. The method according to claim 16, wherein the generating the fifth data directly based on the target text fragment comprises:
recognizing entity words in the target text fragment; and
generating the fifth data directly based on the entity words by using the unified modal neural network.

18. The method according to claim 1, wherein a to-be-trained neural network is configured to embed a plurality of received inputs to obtain a plurality of corresponding input features, and process the plurality of input features by using a self-attention mechanism, and the method comprises:
obtaining a sample text, ground truth global semantic information of the sample text, and at least one ground truth local semantic information of the sample text, wherein the at least one ground truth local semantic information corresponds to at least one text fragment in the sample text;
inputting a plurality of first sample words comprised in the sample text into the to-be-trained neural network to obtain predicted global semantic information and at least one predicted local semantic information of the sample text;
calculating, based on the ground truth global semantic information, the predicted global semantic information, the at least one ground truth local semantic information and the at least one predicted local semantic information, a first loss value;
obtaining a sample text fragment, positive sample data corresponding to the sample text fragment, and negative sample data corresponding to the sample text fragment;
inputting a plurality of second sample words comprised in the sample text fragment and at least one positive image patch comprised in the positive sample data into the to-be-trained neural network to obtain a positive sample visual relevancy between the sample text fragment and the positive sample data, wherein the positive sample visual relevancy indicates a relevancy between text information of the sample text fragment and visual information of the positive sample data;

inputting the plurality of second sample words and at least one negative image patch comprised in the negative sample data into the to-be-trained neural network to obtain a negative sample visual relevancy between the sample text fragment and the negative sample data, wherein the negative sample visual relevancy indicates a relevancy between the text information of the sample text fragment and visual information of the negative sample data;

calculating, based on the positive sample visual relevancy and the negative sample visual relevancy, a second loss value, wherein the second loss value is negatively relevant to the positive sample visual relevancy, and is positively relevant to the negative sample visual relevancy; and adjusting, based on the first loss value and the second loss value, parameters of the to-be-trained neural network, to obtain the trained unified modal neural network.

19. An electronic device, comprising:
one or more processors;
a memory storing one or more programs configured to be executed by the one or more processors, the one or more programs including instructions for:
obtaining global semantic information and at least one local semantic information of a text, wherein the at least one local semantic information corresponds to at least one text fragment in the text;

searching, based on the global semantic information, a database to obtain at least one first data corresponding to the global semantic information;

searching, based on each local semantic information in the at least one local semantic information, the database to obtain at least one second data corresponding to the local semantic information;

obtaining, based on the at least one first data and the at least one second data corresponding to each of the at least one local semantic information, a candidate data set;

matching, based on a relevancy between each text fragment of the at least one text fragment and each candidate data in the candidate data set, target data for the at least one text fragment; and generating, based on the target data matched with each of the at least one text fragment, a video, wherein the global semantic information and the at least one local semantic information are obtained by using a trained unified modal neural network, and wherein the relevancy comprises a visual relevancy between text information of a corresponding text fragment and visual information of corresponding candidate data, and the visual relevancy is determined based on the corresponding text fragment and the corresponding candidate data by using the unified modal neural network.

* * * * *